(12) United States Patent
Oyama

(10) Patent No.: US 12,228,893 B2
(45) Date of Patent: Feb. 18, 2025

(54) INFORMATION PROCESSING DEVICE, CONTROL METHOD, AND STORAGE MEDIUM

(71) Applicant: NEC Corporation, Tokyo (JP)

(72) Inventor: Hiroyuki Oyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 387 days.

(21) Appl. No.: 17/635,585

(22) PCT Filed: Aug. 30, 2019

(86) PCT No.: PCT/JP2019/034184
§ 371 (c)(1),
(2) Date: Feb. 15, 2022

(87) PCT Pub. No.: WO2021/038844
PCT Pub. Date: Mar. 4, 2021

(65) Prior Publication Data
US 2022/0299949 A1 Sep. 22, 2022

(51) Int. Cl.
*G05B 13/04* (2006.01)
*B25J 13/08* (2006.01)
*G05B 13/02* (2006.01)

(52) U.S. Cl.
CPC .......... *G05B 13/042* (2013.01); *B25J 13/082* (2013.01); *G05B 13/024* (2013.01)

(58) Field of Classification Search
CPC ................ G05B 13/042; G05B 13/024; G05B 2219/40014; G05B 2219/40108; G05B 2219/40114; B25J 13/082; B25J 9/1661
See application file for complete search history.

(56) References Cited

U.S. PATENT DOCUMENTS

2007/0299642 A1 12/2007 Kondo
2014/0365009 A1 12/2014 Wettels
(Continued)

FOREIGN PATENT DOCUMENTS

CN 101097440 A 1/2008
CN 107671857 A 2/2018
(Continued)

OTHER PUBLICATIONS

Extended European Search Report for EP Application No. 19943679. 1, dated on Aug. 11, 2022.
(Continued)

*Primary Examiner* — Tameem D Siddiquee

(57) ABSTRACT

The information processing device 1B mainly includes an abstract model information acquisition unit 34X, a measurement information acquisition unit 34Y, and an abstract model generation unit 34Z. The abstract model information acquisition unit 34X is configured to acquire abstract model information I5 regarding an abstract model in which dynamics in a workspace 6 where a robot 5 performs an objective task is abstracted. The measurement information acquisition unit 34Y is configured to acquire measurement information Im indicating a measurement result in the workspace 6. The
(Continued)

abstract model generation unit 34Z is configured to generate an abstract model $\Sigma$ based on the abstract model information I5 and the measurement information Im.

11 Claims, 13 Drawing Sheets

(56) References Cited

U.S. PATENT DOCUMENTS

| | | |
|---|---|---|
| 2018/0085922 A1 | 3/2018 | Oba |
| 2018/0281190 A1 | 10/2018 | Kakisaka et al. |
| 2019/0087976 A1 | 3/2019 | Sugawara et al. |
| 2020/0276708 A1* | 9/2020 | Shah ................. B25J 19/04 |
| 2020/0348696 A1* | 11/2020 | Mangharam ......... G08G 5/0043 |
| 2020/0379893 A1* | 12/2020 | Arechiga Gonzalez ................... G06F 30/15 |
| 2021/0042382 A1* | 2/2021 | Freeman ............... G06F 17/40 |

FOREIGN PATENT DOCUMENTS

| | | |
|---|---|---|
| JP | 2008-009536 A | 1/2008 |
| JP | 2012-125871 A | 7/2012 |
| JP | 2014-240110 A | 12/2014 |
| JP | 2016-528483 A | 9/2016 |
| JP | 2018-051684 A | 4/2018 |
| JP | 2018-167361 A | 11/2018 |
| JP | 2019-056966 A | 4/2019 |

OTHER PUBLICATIONS

Zhou et al., "Optimal mission planner with timed temporal logic constraints", 2015 European Control Conference (ECC), EUCA, Jul. 15, 2015, pp. 759-764.

Verginis et al., "Motion and Cooperative Transportation Planning for Multi-Agent Systems under Temporal Logic Formulas", arxiv. org, Cornell University Library, 201 Olin Library Cornell University Ithaca, NY14853, Mar. 5, 2018, pp. 1-12.

Meng et al., "Human-in-the-Loop Mixed-Initiative Control Under Temporal Tasks", 2018 IEEE International Conference on Robotics and Automation (ICRA), IEEE, May 21, 2018, pp. 6395-6400.

Japanese Office Action for JP Application No. 2021-541933 mailed on Dec. 27, 2022 with English Translation.

International Search Report for PCT Application No. PCT/JP2019/034184, mailed on Nov. 5, 2019.

* cited by examiner

INFORMATION PROCESSING DEVICE, CONTROL METHOD, AND STORAGE MEDIUM

This application is a National Stage Entry of PCT/JP2019/034184 filed on Aug. 30, 2019, the contents of all of which are incorporated herein by reference, in their entirety.

TECHNICAL FIELD

The present invention relates to a technical field of an information processing device, a control method, and a storage medium for performing processing related to tasks to be performed by a robot.

BACKGROUND ART

There is proposed such a control method to perform control of the robot necessary for executing the task when a task to be performed by a robot is given. For example, Patent Literature 1 discloses a robot controller configured, when placing a plurality of objects in a container by a robot with a hand for gripping an object, to determine possible orders of gripping the object by the hand and to determine the order of the objects to be placed in the container based on the index calculated with respect to each of the possible orders.

PRIOR ART DOCUMENTS

Patent Literature

Patent Literature 1: JP 2018-51684A

SUMMARY

Problem to be Solved by the Invention

When determining a control input for a robot to perform a task, it is necessary to set a dynamics model in accordance with the given task and the work environment. Unfortunately, there is an issue that setting such a model through manual operation requires a lot of labor. Besides, when considering the detailed dynamics regarding a whole robot, there is another issue that the optimization process for determining the control input becomes complicated. In contrast, Patent Literature 1 is silent on the technique for determining the dynamics model to solve these issues.

In view of the above-described issue, it is therefore an example object of the present disclosure to provide an information processing device, a control method and a storage medium capable of suitably generating a dynamics model of a robot in a workspace.

Means for Solving the Problem

In one mode of the information processing device, there is provided an information processing device including: an abstract model information acquisition unit configured to acquire abstract model information regarding an abstract model in which dynamics in a workspace where a robot performs a task is abstracted; a measurement information acquisition unit configured to acquire measurement information indicating a measurement result in the workspace; and an abstract model generation unit configured to generate an abstract model based on the abstract model information and the measurement information.

In one mode of the control method, there is provided a control method executed by an information processing device, the control method including: acquiring abstract model information regarding an abstract model in which dynamics in a workspace where a robot performs a task is abstracted; acquiring measurement information indicating a measurement result in the workspace; and generating an abstract model based on the abstract model information and the measurement information.

In one mode of the storage medium, there is provided a storage medium storing a program executed by a computer, the program causing the computer to function as: an abstract model information acquisition unit configured to acquire abstract model information regarding an abstract model in which dynamics in a workspace where a robot performs a task is abstracted; a measurement information acquisition unit configured to acquire measurement information indicating a measurement result in the workspace; and an abstract model generation unit configured to generate an abstract model based on the abstract model information and the measurement information.

Effect of the Invention

An example advantage according to the present invention is to suitably generate a model in which dynamics in a workspace of a robot is abstracted.

EXAMPLE EMBODIMENTS

Hereinafter, an example embodiment of an information processing device, a control method, and a storage medium will be described with reference to the drawings.

First Example Embodiment

(1) System Configuration

Figure 1:
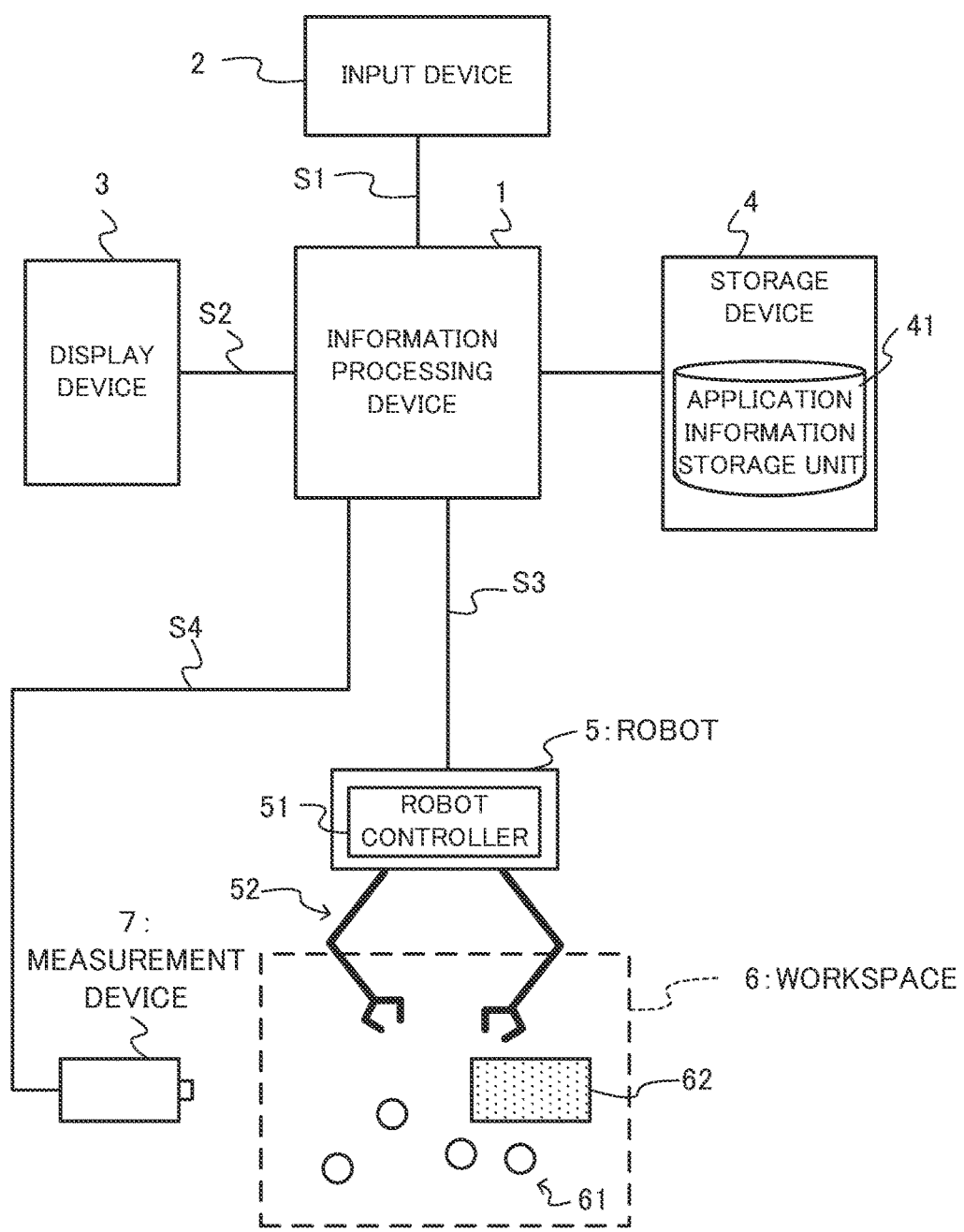
FIG. 1 illustrates the configuration of a robot control system.

FIG. 1 shows a configuration of a robot control system 100 according to the first example embodiment. The robot control system 100 mainly includes an information processing device 1, an input device 2, a display device 3, a storage device 4, a robot 5, and a measurement device 7.

When a task (also referred to as "objective task") to be performed by the robot 5 is specified, the information processing device 1 converts the objective task into a time step sequence of simple tasks each of which the robot 5 can accept, and supplies the sequence to the robot 5. Hereafter, a simple task in units of command that can be accepted by the robot 5 is also referred to as "sub-task".

The information processing device 1 is electrically connected to the input device 2, the display device 3 and the storage device 4. For example, the information processing device 1 receives an input signal "S1" for specifying the objective task from the input device 2. Further, the information processing device 1 transmits to the display device 3 a display signal "S2" for displaying information relating to the task to be executed by the robot 5. Further, the information processing device 1 transmits a control signal "S3" relating to the control of the robot 5 to the robot 5. For example, the information processing device 1 transmits to the robot 5 the control signal S3 which includes a sequence (also referred to as "sub-task sequence") of sub-tasks to be performed for each robot hand 52. Furthermore, the information processing device 1 receives an output signal "S4" from the measurement device 7.

The input device 2 is an interface that receives the input of the user. Examples of the input device 2 include a touch panel, a button, a keyboard and a voice input device. The input device 2 supplies the input signal S1 generated based on the user input to the information processing device 1.

The display device 3 displays information based on the display signal S2 supplied from the information processing device 1 and examples of the display device 3 include a display and a projector. As will be described later, for example, on the basis of the display signal S2, the display device 3 displays an input view (also referred to as "task input view") for specifying information relating to the objective task.

The storage device 4 includes an application information storage unit 41. The application information storage unit 41 stores application information necessary for generating a sequence of sub-tasks from the objective task. Details of the application information will be described later. The storage device 4 may be an external storage device such as a hard disk connected to or built in to the information processing device 1, or may be a storage medium such as a flash memory. The storage device 4 may be a server device that performs data communication with the information processing device 1. In this case, the storage device 4 may include a plurality of server devices.

The robot 5 performs an operation based on the control signal S3 transmitted from the information processing device 1. The robot 5 shown in FIG. 1, as an example, has plural (two) robot arms 52, which are control target and each of which is capable of gripping an object, and performs pick-and-place (i.e., pick up and move processing) of the target object 61 present in the working space 6. The robot 5 has a robot controller 51. The robot controller 51 performs operation control of each of the robot arms 52 based on a sub-task sequence specified for each of the robot arms 52 by the control signal S3.

The workspace 6 is a workspace where the robot 5 performs the objective task. In FIG. 1, as an example, in the workspace 6, there are a plurality of target objects 61 subjected to operation by the robot 5 and an obstacle 62 which interferes the work by the robot 5.

Examples of the measurement device 7 includes one or more external sensors which performs a measurement within a measurement target range including the working space 6, and examples of the external sensors include a camera, a range finder sensor, a sonar and a combination thereof. The measurement device 7 supplies the generated output signal S4 to the information processing device 1. The output signal S4 may be image data taken in the workspace 6 or may be a point cloud data indicating the position of the object in the workspace 6.

The configuration of the robot control system 100 shown in FIG. 1 is an example and various changes may be applied to the configuration. For example, plural robots may exist in the system as the robot 5. In another example, the robot 5 may be equipped with only one or three or more robot arms 52. Even in these cases, the information processing device 1 generates a sub-task sequence to be executed by each control target of the robot 5 based on the objective task, and transmits a control signal S3 indicating the sub-task sequence to the robot 5 having the control target. The measurement device 7 may be a part of the robot 5. Further, the robot controller 51 may be configured separately from the robot 5. Further, each of the input device 2 and the display device 3 may be configured as a part of the information processing device 1 (e.g., a tablet terminal), for example, in such a state that each of them are incorporated into the information processing device 1. Further, the information processing device 1 may be configured by a plurality of devices. In this case, a plurality of devices corresponding to the information processing device 1 perform the transmission and reception of information necessary for executing the pre-allocated processing among these devices. Further, the robot 5 may have the whole or a part of functions of the information processing device 1.

(2) Hardware Configuration of Information Processing Device

Figure 2:
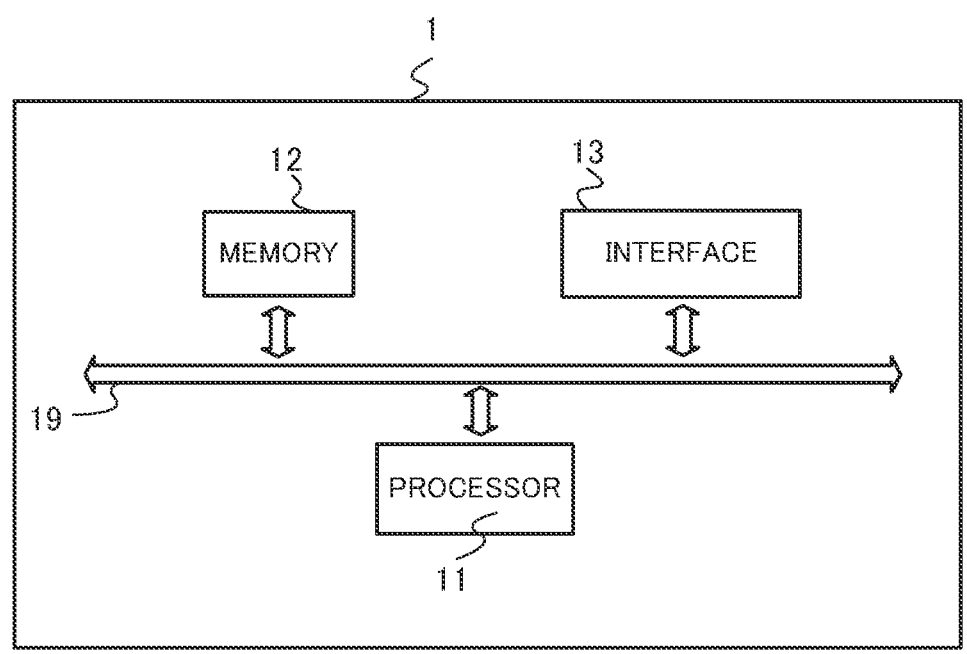
FIG. 2 illustrates the hardware configuration of the information processing device.

FIG. 2 shows the hardware configuration of the information processing device 1. The information processing device 1 includes a processor 11, a memory 12, and an interface 13 as hardware. The processor 11, the memory 12, and the interface 13 are connected via a data bus 19.

The processor 11 executes a predetermined process by executing a program stored in the memory 12. The processor 11 is a processor such as a CPU (Central Processing Unit) and a GPU (Graphics Processing Unit).

The memory 12 is configured by various memories such as a RAM (Random Access Memory) and a ROM (Read Only Memory). In addition, a program for executing a predetermined process by the information processing device 1 is stored in the memory 12. The memory 12 is used as a work memory and temporarily stores information acquired from the storage device 4. The memory 12 may function as a storage device 4. Similarly, the storage device 4 may function as a memory 12 of the information processing device 1. The program executed by the information processing device 1 may be stored in a storage medium other than the memory 12.

The interface 13 is an interface for electrically connecting the information processing device 1 and other devices. Examples of the interface 13 include an interface for connecting the information processing device 1 and the input device 2, an interface for connecting the information processing device 1 and the display device 3, and an interface for connecting the information processing device 1 and the storage device 4. Examples of the interface 13 also include an interface for connecting the information processing device 1 and the robot 5, and an interface for connecting the information processing device 1 and the measurement device 7. These connections may be wired connections and/or may be wireless connections. For example, the interface for connecting the information processing device 1 and the storage device 4 may be a communication interface for wired or wireless transmission and reception of data to and from the storage device 4 under the control of the processor 11. In another example, the information processing device 1 and the storage device 4 may be connected by a cable or the like. In this case, the interface 13 includes an interface which conforms to a USB or a SATA (Serial AT Attachment) or the like in order to exchange data with the storage device 4.

The hardware configuration of the information processing device 1 is not limited to the configuration shown in FIG. 2. For example, the information processing device 1 may include at least one of an input device 2, a display device 3, and a storage device 4. Further, a sound output device such as a speaker may be connected to or built in to the information processing device 1. In these cases, the information processing device 1 may be a tablet terminal or the like in which the input function and the output function are integrated with the main body.

(3) Application Information

Next, a data structure of the application information stored in the application information storage unit 41 will be described.

Figure 3:
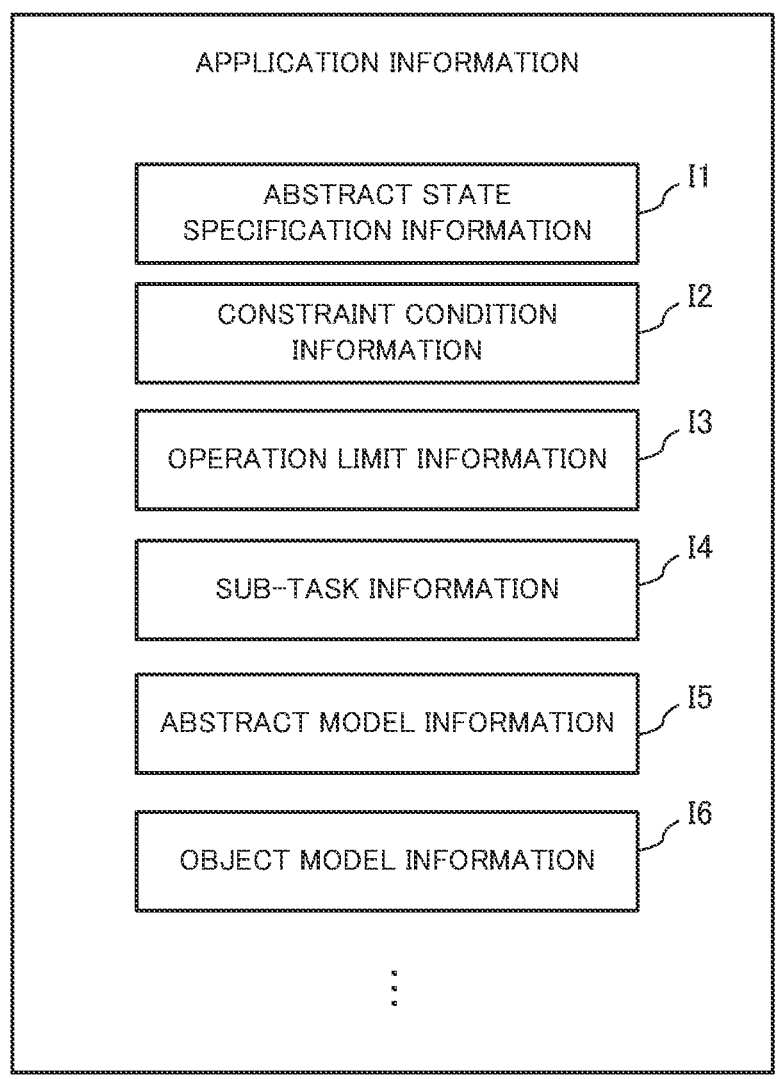
FIG. 3 illustrates an example of the data structure of application information.

FIG. 3 shows an example of a data structure of application information stored in the application information storage unit 41. As shown in FIG. 3, the application information storage unit 41 includes abstract state specification information I1, constraint condition information I2, operation limit information I3, sub-task information I4, abstract model information I5, and object model information I6.

The abstract state specification information I1 specifies an abstract state to be defined in order to generate the sub-task sequence. The above-mentioned abstract state is an abstract state of an object in the workspace 6, and is defined as a proposition to be used in the target logical formula to be described later. For example, the abstract state specification information I1 specifies the abstract state to be defined for each type of objective task. The objective task may be various types of tasks such as pick-and-place, capture of moving object(s) and turn of a screw.

The constraint condition information I2 indicates constraint conditions at the time of performing the objective task. The constraint condition information I2 indicates, for example, a constraint that the robot 5 (robot arm 52) must not be in contact with an obstacle when the objective task is pick-and-place, and a constraint that the robot arms 52 must not be in contact with each other, and the like. The constraint condition information I2 may be information in which the constraint conditions suitable for each type of the objective task are recorded.

The operation limit information I3 is information on the operation limit of the robot 5 to be controlled by the information processing device 1. For example, the operation limit information I3 in the case of the robot 5 shown in FIG. 1 is information that defines the maximum reaching speed by the robot arm 52.

The sub-task information I4 indicates information on sub-tasks that the robot 5 can accept. For example, when the objective task is pick-and-place, the sub-task information I4 defines a sub-task "reaching" that is the movement of the robot arm 52, and a sub-task "grasping" that is the grasping by the robot arm 52. The sub-task information I4 may indicate information on sub-tasks that can be used for each type of objective task.

The abstract model information I5 is information on a model (also referred to as "abstract model") in which the dynamics in the workspace 6 are abstracted. The abstract model is represented by a model in which real dynamics are abstracted by a hybrid system, as will be described later. The abstract model Information I5 includes information indicative of the switching conditions of the dynamics in the above-mentioned hybrid system. For example, one of the switching conditions in the case of the pick-and-place shown in FIG. 1 is that the target object 61 cannot be moved unless it is gripped by the hand of the robot arm 52. The abstract model information I5 includes information on an abstract model suitable for each type of the objective task.

The object model information I6 is information relating to an object model of each object (the robot arms 52, target objects 61, and obstacle 62 in the case of FIG. 1) to be recognized from the output signal S4 generated by the measurement device 7. The object model described above is, for example, a learning model in machine learning such as a neural network. The learning model is, for example, learned so as to output the type and position of each object subjected to measurement by the output signal S4, and the parameters of the learned learning model are recorded in the object model information I6. In other examples, the object model information I6 may include CAD data of the objects to be recognized.

In addition to the information described above, the application information storage unit 41 may store various kinds of information related to the generation processing of the sub-task sequence. For example, the application information storage unit 41 may include a dynamic model of the robot 5 itself, an abstracted dynamic model of the robot arms 52, and a simplified model for calculating a required time for grasping the target object 61 by the robot arm 52.

(4) Functional Block

Figure 4:
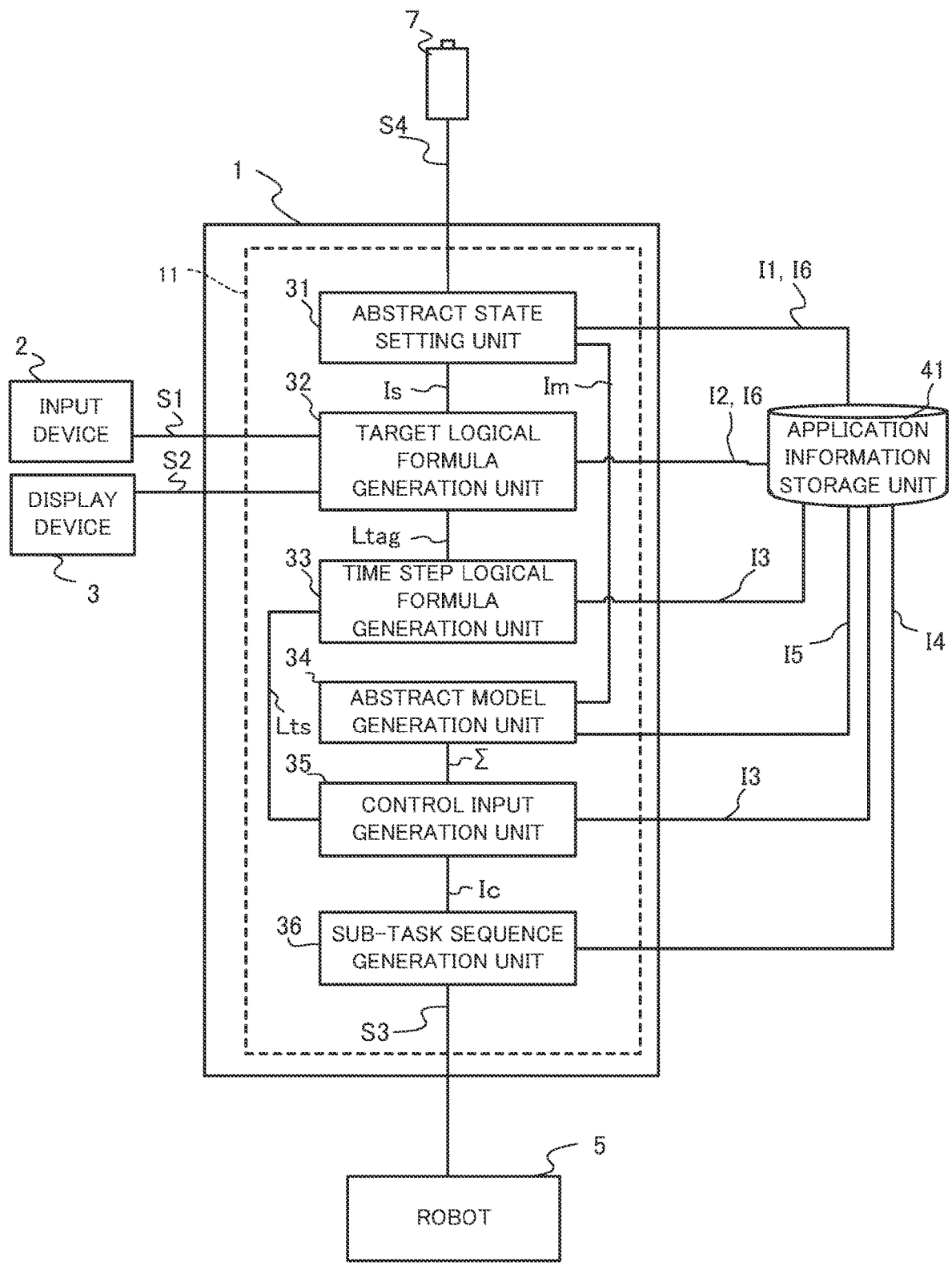
FIG. 4 illustrates an example of a functional block of the information processing device.

FIG. 4 is an example of a functional block of the information processing device 1. The processor 11 of the information processing device 1 functionally includes an abstract state setting unit 31, a target logical formula generation unit 32, a time step logical formula generation unit 33, an abstract model generation unit 34, a control input generation unit 35, and a sub-task sequence generation unit 36. In FIG. 4, an example of data to be transmitted and received among the blocks is shown, but is not limited thereto.

The abstract state setting unit 31 generates information (also referred to as "measurement information Im") indicating the measurement result in the working space 6, based on the output signal S4 supplied from the measurement device 7. Specifically, when receiving the output signal S4, the abstract state setting unit 31 refers to the object model information I6 and the like and recognizes the type (classification) and the position of each object (the target objects 61, the obstacle 62, etc.) in the workspace 6 related to the execution of the objective task, and generates the measurement information Im including the recognition result. The abstract state setting unit 31 supplies the generated measurement information Im to the abstract model generation unit 34.

Further, the abstract state setting unit 31 sets an abstract state in the workspace 6 that needs to be considered when executing the objective task, based on the measurement information Im described above, the abstract state specification information I1 acquired from the application information storage unit 41, and the like. In this case, the abstract state setting unit 31 defines a proposition for each abstract state to be represented by a logical formula. The abstract state setting unit 31 supplies information (also referred to as "abstract state setting information Is") indicative of the set abstract state to the target logical formula generation unit 32.

When receiving the input signal S1 relating to the objective task from the input device 2, on the basis of the abstract state setting information Is, the target logical formula generation unit 32 converts the objective task indicated by the input signal S1 into a logical formula (also referred to as a "target logical formula Ltag") in the form of the temporal logic representing the final state to be achieved. In this case, by referring to the constraint condition information I2 from the application information storage unit 41, the target logical formula generation unit 32 adds the constraint conditions to be satisfied in executing the objective task to the target logical formula Ltag. Then, the target logical formula generation unit 32 supplies the generated target logical formula Ltag to the time step logical formula generation unit 33. Further, the target logical formula generation unit 32 generates a display signal S2 for displaying a task input view for receiving an input relating to the objective task, and supplies the display signal S2 to the display device 3.

The time step logical formula generation unit 33 convers the target logical formula Ltag supplied from the target logical formula generation unit 32 to the logical formula (also referred to as "time step logical formula Lts") representing the state at each time step. Then, the time step logical formula generation unit 33 supplies the generated time step logical formula Lts to the control input generation unit 35.

On the basis of the measurement information Im and the abstract model information I5 stored in the application information storage unit 41, the abstract model generation unit 34 generates an abstract model "Σ" in which the real dynamics in the workspace 6 are abstracted. In this case, the abstract model generation unit 34 considers the target dynamics as a hybrid system in which the continuous dynamics and the discrete dynamics are mixed, and generates an abstract model Σ based on the hybrid system. The method for generating the abstract model Σ will be described later. The abstract model generation unit 34 supplies the generated abstract model Σ to the control input generation unit 35.

The control input generation unit 35 determines a control input for the robot 5 for each time step, wherein the control input optimizes the evaluation function while satisfying the time step logical formula Lts supplied from the time step logical formula generation unit 33 and the abstract model Σ supplied from the abstract model generation unit 34. Then, the control input generation unit 35 supplies information (also referred to as "control input information Ic") indicative of the control input for the robot 5 for each time step to the sub-task sequence generation unit 36.

The sub-task sequence generation unit 36 generates a sub-task sequence based on the control input information Ic supplied from the control input generation unit 35 and the sub-task information I4 stored in the application information storage unit 41, and supplies a control signal S3 indicating the sub-task sequence to the robot 5.

(5) Processing Details for Each Block

Next, the details of the processing for each functional block shown in FIG. 4 will be described with reference to specific examples.

(5-1) Abstract State Setting Unit

The abstract state setting unit 31 generates a measurement information Im indicating the measurement result (type, position, etc.) of the object in the workspace 6 based on the output signal S4 supplied from the measurement device 7 and sets the abstract state in the workspace 6. In this case, the abstract state setting unit 31 refers to the abstract state specification information I1 and recognizes the abstract state to be set in the workspace 6. The abstract state to be set in the workspace 6 varies depending on the type of the objective task. Therefore, when the abstract state to be set is defined for each type of the objective task in the abstract state specification information I1, the abstract state setting unit 31 refers to the abstract state specification information I1 corresponding to the objective task specified by the input signal S1 and recognizes the abstract state to be set.

Figure 5:
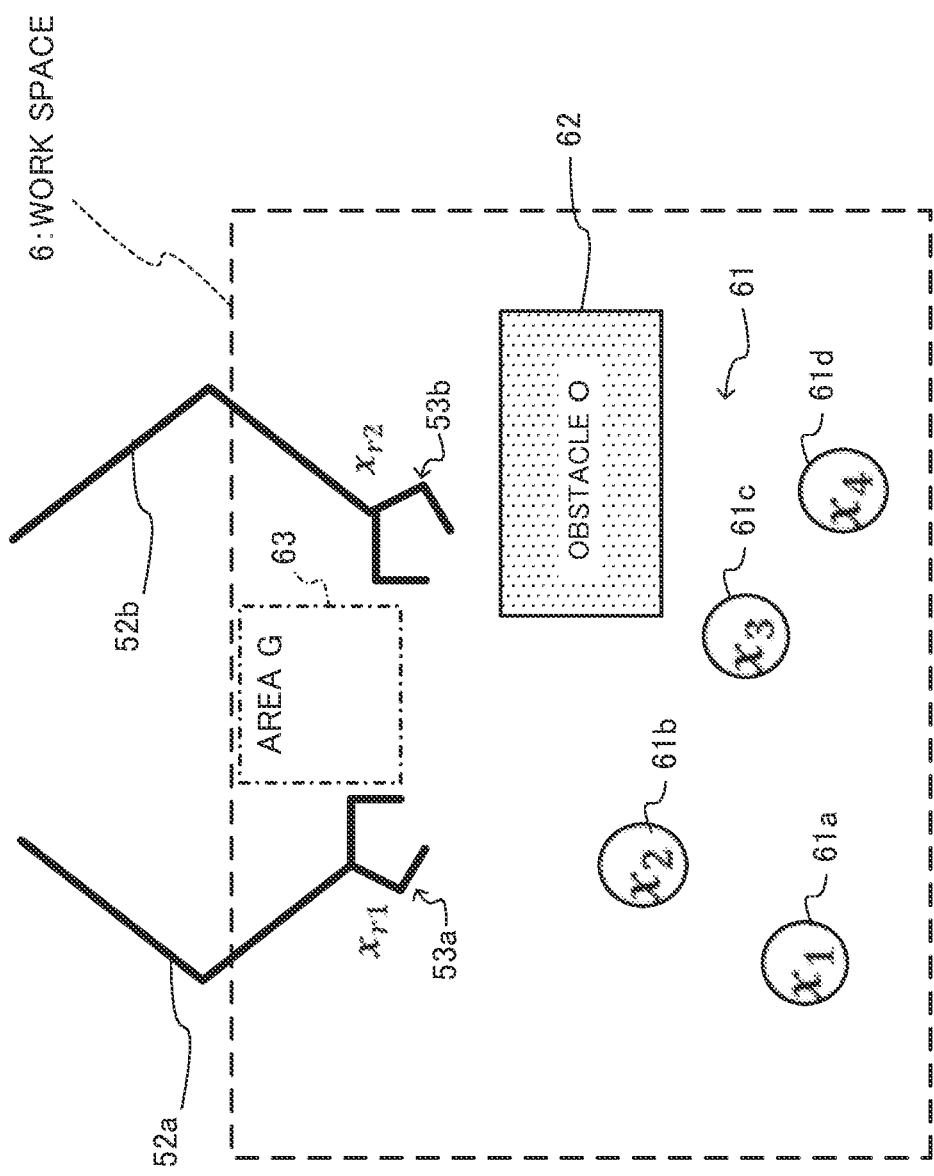
FIG. 5 illustrates a bird's-eye view of a workspace.

FIG. 5 shows a bird's-eye view of the workspace 6. In the workspace 6 shown in FIG. 5, there are two robot arms 52a and 52b, four target objects 61a to 61d, and an obstacle 62.

In this case, by analyzing the output signal S4 received from the measurement device 7 using the object model information I6 and the like, the abstract state setting unit 31 firstly recognizes the states of the target objects 61, the presence range of the obstacle 62, and the presence range of the area G to be set as a goal point. Here, the abstract state setting unit 31 recognizes the position vectors "$x_1$" to "$x_4$" indicative of the centers of the target objects 61a to 61d as the positions of the target objects 61a to 61d, respectively. Further, the abstract state setting unit 31 recognizes the position vector "$x_{r1}$" of the robot hand 53a for grasping a target object as the position of the robot arm 52a and the position vector "$x_{r2}$" of the robot hand 53b for grasping a target object as the position of the robot arm 52b. Similarly, the abstract state setting unit 31 recognizes the postures of the target objects 61a to 61d (it is unnecessary in the example of FIG. 5 because each target object is spherical), the existence range of the obstacle 62, the existence range of the area G, and the like. For example, when assuming that the obstacle 62 is a rectangular parallelepiped and the area G is a rectangle, the abstract state setting unit 31 recognizes the position vector of each vertex of the obstacle 62 and the area G. Then, the abstract state setting unit 31 generates the measurement information Im which includes these recognition results based on the output signal S4.

The abstract state setting unit 31 determines the abstract state to be defined in the objective task by referring to the abstract state specification information I1. In this case, on the basis of the measurement information Im, the abstract state setting unit 31 recognizes objects and area(s) existing in the workspace 6 and determines propositions indicating the abstract state based on the recognition result (e.g., the number of the objects and the area(s) and the type thereof) and the constraint condition information I2 relating to the objects and the area(s).

In the example of FIG. 5, the abstract state setting unit 31 assigns identification labels "1" to "4" to the target objects 61a to 61d specified by the measurement information Im, respectively. Further, the abstract state setting unit 31 defines a proposition "$g_i$" that the target object "i" (i=1 to 4) is present in the area G (see the broken line frame 63) that is the goal point to be finally placed. Further, the abstract state setting unit 31 defines an identification label "O" to the obstacle 62 specified by the measurement information Im, and defines the proposition "$o_i$" that the target object i interferes with the obstacle O. Furthermore, the abstract state setting unit 31 defines a proposition "h" that a robot arm 52 interferes with another robot arm 52.

In this way, by referring to the abstract state specification information I1, the abstract state setting unit 31 recognizes the abstract state to be defined, and defines the propositions ($g_i$, $o_i$, h in the above-described example) representing the abstract state according to the number of the target objects 61, the number of the robot arms 52, the number of the obstacles 62, and the like. The abstract state setting unit 31 supplies the target logical formula generation unit 32 with the abstract state setting information Is which includes the information indicative of the propositions representing the abstract state.

(5-2) Target Logical formula Generation Unit

Figure 6:
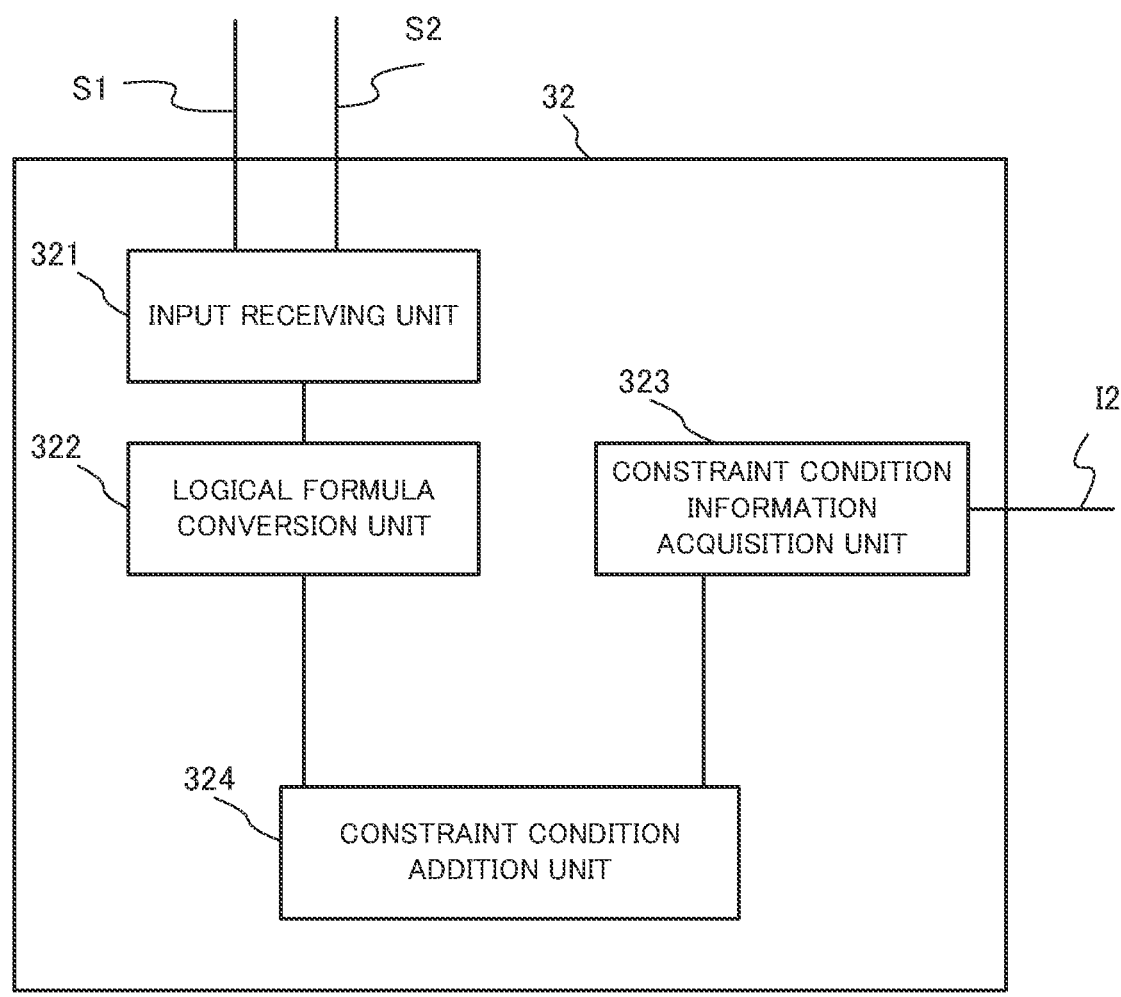
FIG. 6 illustrates a functional block of a target logical formula generation unit.

FIG. 6 is a functional block diagram of the target logical formula generation unit 32. As shown in FIG. 6, the target logical formula generation unit 32 functionally includes an input receiving unit 321, a logical formula conversion unit 322, a constraint condition information acquisition unit 323, and a constraint condition addition unit 324.

The input receiving unit 321 receives an input signal S1 that specifies the type of the objective task and the final state of the target objects subjected to operation by the robot. Further, the input receiving unit 321 transmits the display signal S2 regarding the task input view for receiving these inputs to the display device 3.

The logical formula conversion unit 322 converts the objective task specified by the input signal S1 into a logical formula using the temporal logic. It is noted that there are various existing technologies for the method of converting tasks expressed in natural language into logical formulas. For example, in the example of FIG. 5, it is herein assumed that the objective task "the object 2 is finally present in the area G" is given. In this case, the logical formula conversion unit 322 generates the logical formula "$\Diamond g_2$" which represents the objective task by using the operator "$\Diamond$" corresponding to "eventually" of the linear logical formula (LTL: Linear Temporal Logic) and the proposition "$g_i$" defined by the abstract state setting unit 31. The logical formula conversion unit 322 may express the logical formula by using any operators based on the temporal logic other than the operator "$\Diamond$" such as logical AND "$\wedge$", logical OR "$\vee$", negative "$\neg$", logical implication "$\Rightarrow$", always "$\Box$", next "$\circ$", until "U", etc.). The logical formula may be expressed by any temporal logic other than linear temporal logic such as MTL (Metric Temporal Logic) and STL (Signal Temporal Logic).

The constraint condition information acquisition unit 323 acquires the constraint condition information I2 from the application information storage unit 41. When the constraint condition information I2 is stored in the application information storage unit 41 for each task type, the constraint condition information acquisition unit 323 acquires the constraint condition information I2 corresponding to the type of the objective task specified by the input signal S1 from the application information storage unit 41.

The constraint condition addition unit 324 generates a target logical formula Ltag by adding the constraint conditions indicated by the constraint condition information I2 obtained by the constraint condition information acquisition unit 323 to the logical formula generated by the logical formula conversion unit 322.

For example, provided that two constraint conditions "a robot arm 52 does not interfere with another robot arm 52" and "the target object i does not interfere with the obstacle O" for pick-and-place are included in the constraint condition information I2, the constraint condition addition unit 324 converts these constraint conditions into logical formulas. Specifically, the constraint condition addition unit 324 converts the above-described two constraint conditions into the following logical formulas by using the proposition "$o_i$" and the proposition "h" defined by the abstract state setting unit 31 according to the description of FIG. 5.

$$\Box \neg h$$

$$\wedge_i \Box \neg o_i$$

Therefore, in this case, the constraint condition addition unit 324 generates the following target logical formula Ltag by adding the logical formulas of these constraint conditions to the logical formula "$\Diamond g_2$" corresponding to the objective task "the target object 2 is eventually present in the area G".

$$(\Diamond g_2) \wedge (\Box \neg h) \wedge (\wedge_i \Box \neg o_i)$$

In practice, the constraint conditions corresponding to the pick-and-place is not limited to the above-described two constraint conditions and there are other constraint conditions such as "a robot arm 52 does not interfere with the obstacle O", "plural robot arms 52 do not grasp the same target object", "target objects does not contact with each other". Such constraint conditions are also stored in the constraint condition information I2 and are reflected in the target logical formula Ltag.

Next, an input example of the objective task on the task input view will be described.

Figure 7:
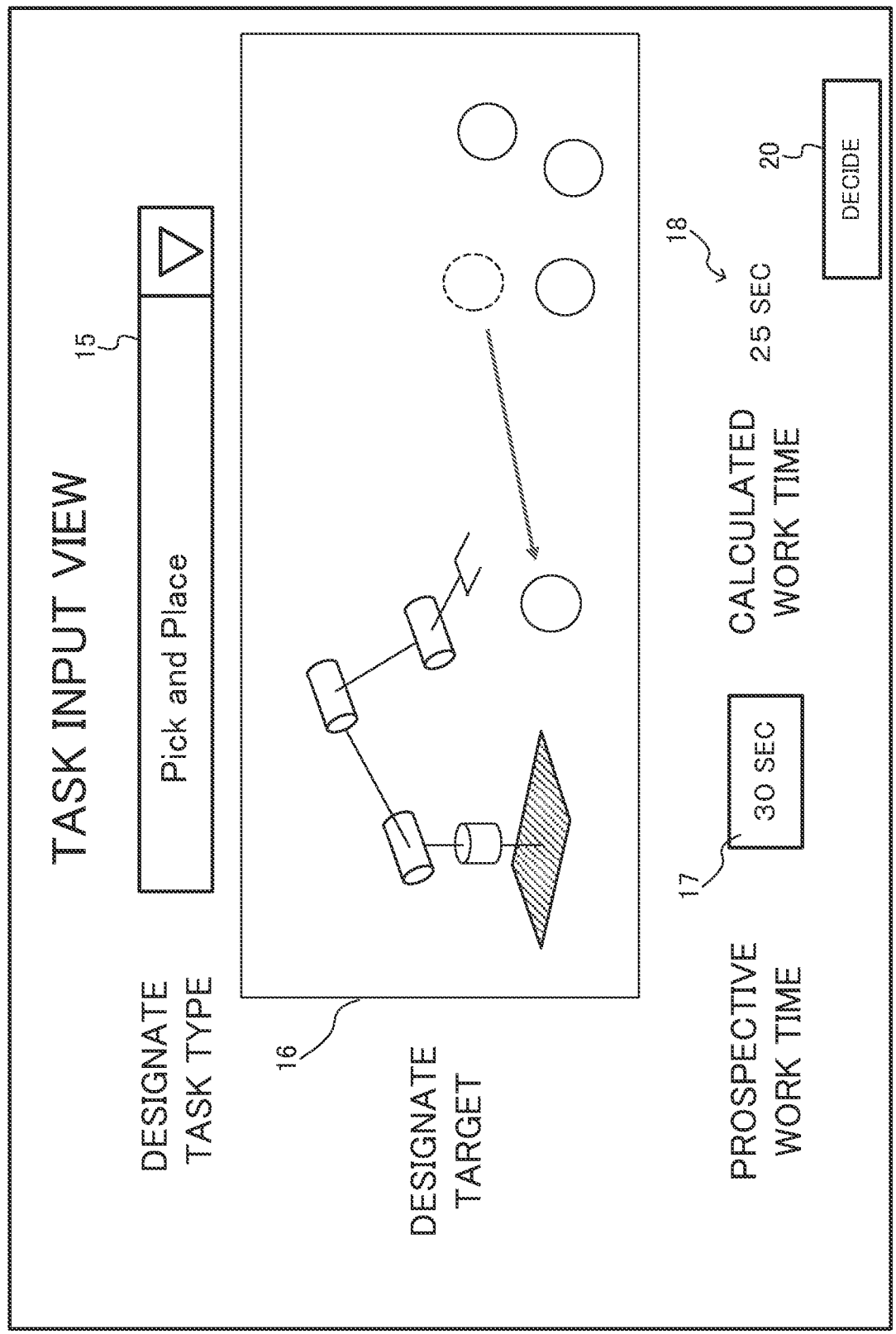
FIG. 7 illustrates a first display example of a task input view.

FIG. 7 shows a first display example of a task input view. The input receiving unit 321 generates the display signal S2 and transmits the display signal S2 to the display device 3 to thereby display the task input view shown in FIG. 7 on the display device 3. The task input view shown in FIG. 7 mainly includes a task type designation field 15, an image display field 16, a prospective work time designation field 17, a calculated work time display area 18, and a determination button 20.

The input receiving unit 321 receives an input for specifying the type of the objective task in the task type designation field 15. Here, as an example, the task type designation field 15 is an input field of a pull-down menu type, and the input receiving unit 321 selectably displays a list of candidates of the objective task type in the task type designation field 15. In this case, pick-and-place is designated as the objective task type in the task type designation field 15.

Further, on the image display field 16, the input receiving unit 321 displays a CAD image reproducing the environment in the working space 6 by using a CAD model of the target objects 61 stored in the object model information I6. In this case, for example, the input receiving unit 321 generates a CAD image reproducing the environment in the workspace 6, based on the measurement information Im generated by the abstract state setting unit 31 and the object model information I6 including CAD data.

Then, the input receiving unit 321 receives an input for specifying the final position of each of the target objects 61 based on a touch panel operation or a drag-and-drop operation by a mouse on the image display field 16. Then, the input receiving unit 321 recognizes the objective task based on the input signal S1 indicating the input in the task type designation field 15 and the image display field 16.

In some embodiments, when receiving the input of the final position for each of the target objects 61 on the image display field 16, the input receiving unit 321 may display on the image display field 16 such an animation that the robot 5 performs the objective task. In other words, the input receiving unit 321 may display on the image display field 16 an animation of such process of a change in the workspace 6 that the target object 61 is carried by the robot 5 to the specified final position. In this case, for example, the input receiving unit 321 recognizes the operation of the robot 5 for each time step and the position change in the respective target objects 61 based on the control input information Ic or the sub-task sequence which are obtained based on the target logical formula Ltag into which the objective task is converted. The input receiving unit 321 displays the animation generated based on the recognition result on the image display field 16.

Instead of displaying the CAD image of the workspace 6, the input receiving unit 321 may display, on the image display field 16, a two-dimensional image representing a bird's-eye view of the workspace 6. In this case as well, the input receiving unit 321 can suitably receive the designation of the final position of each of the target objects 61 based on a touch panel operation or a drag-and-drop operation by mouse on the image display field 16.

Further, the input receiving unit 321 receives the input of the prospective (expected) work time of the objective task in the prospective work time designation field 17. In some embodiments, the input receiving unit 321 may supply the prospective time designated in the prospective work time designation field 17 to the time step logical formula generation unit 33. In this case, the time step logical formula generation unit 33 can suitably determine the target time step number based on the designated prospective time.

Further, the input receiving unit 321 displays, on the calculation work time display area 18, the prospective work time of the objective task calculated by the information processing device 1. In this case, for example, the input receiving unit 321 calculates the required number of time steps based on the target logical formula Ltag obtained by converting the objective task designated on the task input view, and displays the above-described prospective work time. When the designated objective task cannot be achieved, e.g., when the control input generation unit 35 cannot generate the control input information Ic based on the objective task, the input receiving unit 321 displays an error on the calculation work time display area 18. Thereby, the input receiving unit 321 prompts re-input of the final position of the target objects on the task input view.

When it is detected that the determination button 20 has been selected, the input receiving unit 321 supplies the information on the objective task, which is recognized based on the input signal S1 indicating the input content on the task input view, to the logical formula conversion unit 322. Thereafter, the information processing device 1 generates a control signal S3 and transmits the generated control signal S3 to the robot 5 to thereby let the robot 5 perform the objective task.

Figure 8:
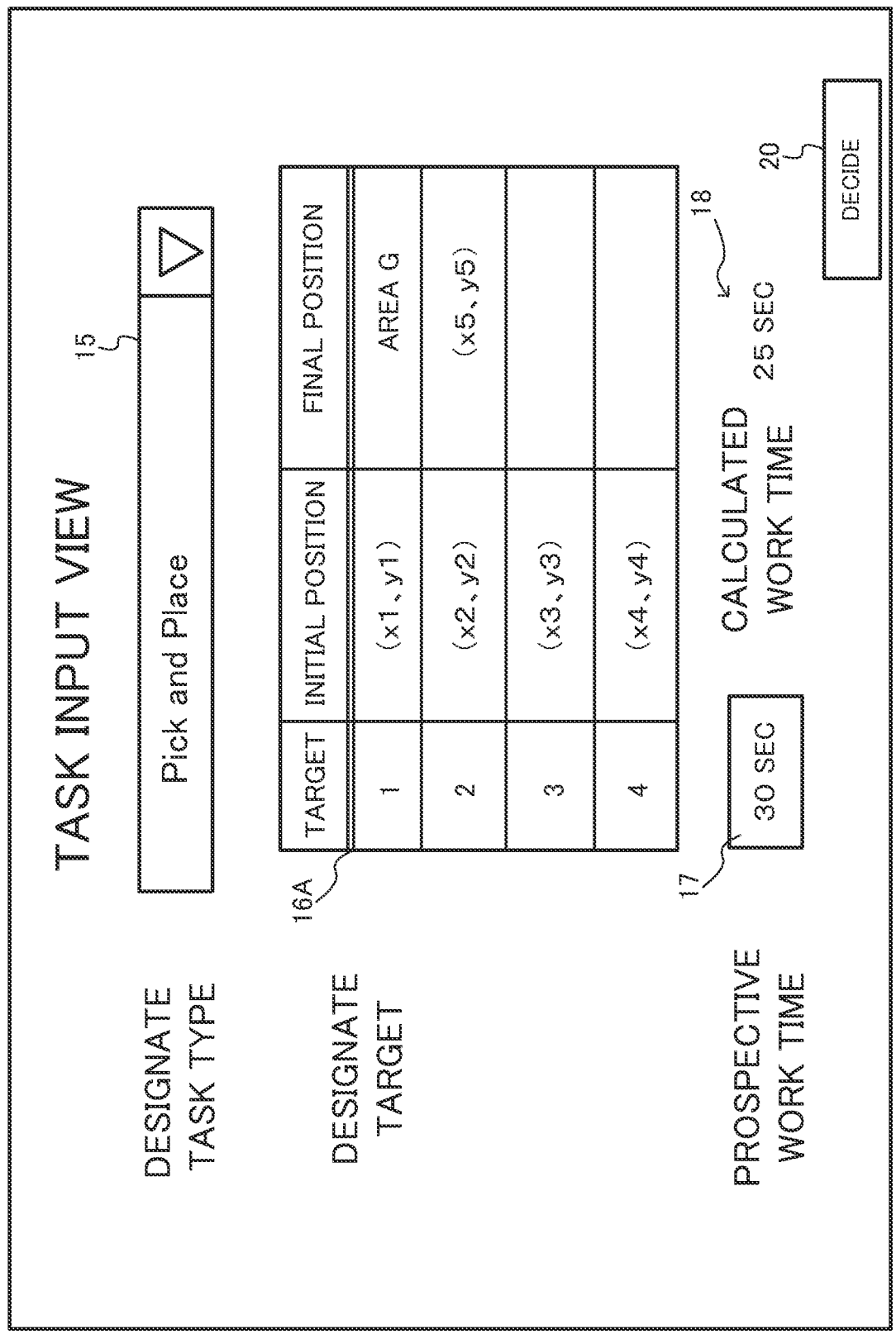
FIG. 8 illustrates a second display example of a task input view.

FIG. 8 shows a second display example of a task input view. The input receiving unit 321 transmits the display signal S2 to the display device 3, and displays the task input view shown in FIG. 8 on the display device 3. In the second display example, instead of displaying the image display field 16 for displaying the CAD image relating to the working space 6 according to the first display example, the input receiving unit 321 displays a table field 16A for specifying the final position for each target object on the task input view.

Here, the table field 16A has items "TARGET", "INITIAL POSITION" and "FINAL POSITION". The item "TARGET" indicates an identification label for each labeled target object 61. The item "INITIAL POSITION" indicates the coordinate value of the initial position in the workspace 6 of each target object 61. This coordinate value is the coordinate value defined in the workspace 6. The item "FINAL POSITION" is an input field, it is possible to input information with respect to each of the target objects 61. In the example of FIG. 8, the input receiving unit 321 receives an input specifying the coordinate value indicating the final position or the defined area name (in FIG. 8, the "area G"). When any input field of the item "FINAL POSITION" is selected, the input receiving unit 321 may display an image schematically showing the working space 6 (e.g., an image displayed in the image display field 16) and receive the final position of the target object 61 on the image.

(5-3) Target Logical Formula Generation Unit

The time step logical formula generation unit 33 determines the number of time steps (also referred to as the "target time step number") for completing the objective task, and determines combinations of propositions representing the state at each time step such that the target logical formula Ltag is satisfied with the target time step number. Since the combinations are normally plural, the time step logical formula generation unit 33 generates a logical formula obtained by combining these combinations by logical OR as the time step logical formula Lts. Each of the combinations described above is a candidate of a logical formula representing a sequence of operations to be instructed to the robot 5, and therefore it is hereinafter also referred to as "candidate φ".

Here, a description will be given of a specific example of the processing executed by the time step logical formula generation unit 33 when the objective task "the target object 2 eventually exists in the area G" is set according to the description of FIG. 5.

In this case, the following target logical formula Ltag is supplied from the target logical formula generation unit 32 to the time step logical formula generation unit 33.

$$(\Diamond g_2) \wedge (\Box \neg h) \wedge (\wedge_i \Box \neg o_i)$$

In this case, the time-step logical formula generation unit 33 uses the proposition "$g_{i,k}$" that is the extended proposition "$g_i$" to include the concept of time steps. Here, the proposition "$g_{i,k}$" is the proposition that the target object i exists in the area G at the time step k. Here, when the target time step number is set to "3", the target logical formula Ltag is rewritten as follows.

$$(\Diamond g_{2,3}) \wedge (\wedge_{k=1,2,3} \Box \neg h_k) \wedge (\wedge_{i,k=1,2,3} \Box \neg o_i)$$

$\Diamond g_{2,3}$ can be rewritten as shown in the following expression.

$$\Diamond g_{2,3} = (\neg g_{2,1} \wedge \neg g_{2,2} \wedge g_{2,3}) \vee (\neg g_{2,1} \wedge g_{2,2} \wedge g_{2,3}) \vee (g_{2,1} \wedge \neg g_{2,2} \wedge g_{2,3}) \vee (g_{2,1} \wedge g_{2,2} \wedge g_{2,3})$$

The target logical formula Ltag described above is represented by a logical OR ($\varphi_1 \vee \varphi_2 \vee \varphi_3 \vee \varphi_4$) of four candidates "$\varphi_1$" to "$\varphi_4$" as shown in below.

$$\varphi_1 = (\neg g_{2,1} \wedge \neg g_{2,2} \wedge g_{2,3}) \wedge (\wedge_{k=1,2,3} \Box \neg h_k) \wedge (\wedge_{i,k=1,2,3} \Box \neg o_{i,k})$$

$$\varphi_2 = (\neg g_{2,1} \wedge g_{2,2} \wedge g_{2,3}) \wedge (\wedge_{k=1,2,3} \Box \neg h_k) \wedge (\wedge_{i,k=1,2,3} \Box \neg o_{i,k})$$

$$\varphi_3 = (g_{2,1} \wedge \neg g_{2,2} \wedge g_{2,3}) \wedge (\wedge_{k=1,2,3} \Box \neg h_k) \wedge (\wedge_{i,k=1,2,3} \Box \neg o_{i,k})$$

$$\varphi_4 = (g_{2,1} \wedge g_{2,2} \wedge g_{2,3}) \wedge (\wedge_{k=1,2,3} \Box \neg h_k) \wedge (\wedge_{i,k=1,2,3} \Box \neg o_{i,k})$$

Therefore, the time-step logical formula generation unit 33 defines the logical OR of the four candidates $\varphi_1$ to $\varphi_4$ as the time-step logical formula Lts. In this case, the time step logical formula Lts is true if at least one of the four candidates $\varphi_1$ to $\varphi_4$ is true.

In some embodiments, by referring to the operation limit information I3, the time step logical formula generation unit 33 determines the feasibility with respect to each of the generated candidates and excludes one or more candidates determined to have no feasibility. For example, the time step logical formula generation unit 33 recognizes the distance that the robot hand can move per one time step based on the operation limit information I3. Further, the time step logical formula generation unit 33 recognizes the distance between the target object to be moved (the target object 2) and the robot hand based on the position vectors of the target object and the robot hand indicated by the measurement information Im. Then, the time step logical formula generation unit 33 determines the feasibility based on these distances.

For example, the time step logical formula generation unit 33 determines that the above-described candidate $\varphi_3$ and candidate $\varphi_4$ have no feasibility if it is determined that both the robot hand 53a and the robot hand 53b are distant from the target object 2 by more than the movable distance per one time step. In this case, the time step logical formula generation unit 33 excludes the candidate $\varphi_3$ and the candidate $\varphi_4$ from the time step logical formula Lts. In this case, the time-step logical formula Lts is the logical OR ($\varphi_1 \vee \varphi_2$) of the candidate $\varphi_1$ and the candidate $\varphi_2$.

In this way, the time step logical formula generation unit 33 excludes the non-realizable candidates with reference to the operation limit information I3 from the time step logical formula Lts to thereby suitably reduce the processing load of the processing units at the subsequent stages.

Next, a supplementary description will be given of a method for setting the target time step number.

For example, the time step logical formula generation unit 33 determines the target time step number based on the prospective work time (see prospective work time designation field 17 in FIGS. 7 and 8) designated by the user input. In this case, the time step logical formula generation unit 33 calculates the target time step number based on the prospective work time described above and the information on the time width per time step stored in the memory 12 or the storage device 4. In another example, the time step logical formula generation unit 33 stores in advance information in the memory 12 or the storage device 4 in which a suitable target time step number is associated with each type of objective task, and determines the target time step number in accordance with the type of objective task to be executed by referring to the information.

In some embodiments, the time step logical formula generation unit 33 sets the target time step number to a predetermined initial value. Then, the time step logical formula generation unit 33 gradually increases the target time step number until the time step logical formula Lts with which the control input generation unit 35 can determine the control input is generated. In this case, if the control input generation unit 35 ends up not being able to derive the optimal solution in the optimization processing with the set target time step number, the time step logical formula generation unit 33 add a predetermined number (1 or more integers) to the target time step number.

At this time, the time step logical formula generation unit 33 may set the initial value of the target time step number to a value smaller than the number of time steps corresponding to the work time of the objective task expected by the user (for example, half of the expected time designated in the expected work time designation field 17). Thus, the time step logical formula generation unit 33 suitably suppresses setting the unnecessarily large target time step number.

The effect of the above-described setting method of the target time step number will be supplementarily described. In general, the larger the target time step number is, the higher the possibility that an optimal solution exists in the optimization processing by the control input generation unit 35 becomes, and the processing load such as the minimization processing and the required time of the robot 5 for achieving the purpose task increases with increase in the target time step number. In consideration of the above, the time step logical formula generation unit 33 sets the initial value of the target time step number to a small value and gradually increases the target time step number until the solution in the optimization process by the control input generation unit 35 exists. Thereby, the time step logical formula generation unit 33 can set the number of target time steps as small as possible in the range in which the solution in the optimization process by the control input generation unit 35 exists. Therefore, in this case, it is possible to reduce the processing load in the optimization process, and to shorten the time required for the robot 5 to achieve the objective task.

(5-4) Abstract Model Generation Unit

The abstract model generation unit 34 generates the abstract model $\Sigma$ based on the measurement information Im and the abstract model information I5. Here, the information necessary for generating the abstract model $\Sigma$ is recorded in the abstract model information I5 for each type of the objective task. For example, when the objective task is pick-and-place, an abstract model in a general format that does not specify the position or number of the target objects, the position of the area where the target objects is to be placed, the number of robots 5 (or the number of robotic arms 52), and the like is recorded in the abstract model information I5. Then, the abstract model generation unit 34 generates the abstract model $\Sigma$ by applying the position and the number of the target objects, the position of the area where the object is to be placed, the number of robots 5, and the like which are indicated by the measurement information Im to the general-purpose type of abstract model recorded in the abstract model information I5.

Here, at the time of work of the objective task by the robot 5, the dynamics in the workspace 6 is frequently switched. For example, in the case of pick-and-place, while the robot arm 52 is gripping the target object i, the target object i can be moved. However, if the robot arm 52 is not gripping the target object i, the target object i cannot be moved.

In view of the above, in the present example embodiment, in the case of pick-and-place, the operation of grasping the target object i is abstracted by the logical variable "$\delta_i$". In this case, for example, the abstract model generation unit 34 can define the abstract model $\Sigma$ to be set for the workspace 6 shown in FIG. 5 as the following equation (1).

$$\begin{bmatrix} x_{r1} \\ x_{r2} \\ x_1 \\ \vdots \\ x_4 \end{bmatrix}_{k+1} = I \begin{bmatrix} x_{r1} \\ x_{r2} \\ x_1 \\ \vdots \\ x_4 \end{bmatrix}_k + \begin{bmatrix} I & 0 \\ 0 & I \\ \delta_{1,1}I & \delta_{2,1}I \\ \vdots & \vdots \\ \delta_{1,4}I & \delta_{2,4}I \end{bmatrix} \begin{bmatrix} u_1 \\ u_2 \end{bmatrix} \quad (1)$$

$$h_{ij_{min}}(1-\delta_i) \le h_{ij}(x) \le h_{ij_{max}}\delta_i + (\delta_i - 1)\varepsilon$$

Here, "$u_j$" indicates a control input for controlling the robot hand j ("j=1" is the robot hand 53a, "j=2" is the robot hand 53b), and "I" indicates a unit matrix. It is noted that the control input is herein assumed to be a speed as an example but it may be an acceleration. Further, "$\delta_{j,i}$" is a logical variable that is set to "1" when the robot hand j grasps the target object i and is set to "0" in other cases. Each of "$x_{r1}$" and "$x_{r2}$" indicates the position vector of the robot hand j, and each of "$x_1$" to "$x_4$" indicates the position vector of the target object i. Further, "h (x)" is a variable to be "h (x)>=0" when the robot hand exists in the vicinity of the target object to the extent that it can grasp the object, and satisfies the following relationship with the logical variable δ.

$$\delta=1 \Leftrightarrow h(x) \geq 0$$

Here, the expression (1) is a difference equation showing the relationship between the state of the objects at the time step k and the state of the objects at the time step k+1. Then, in the above expression (1), since the state of the grasp is represented by a logic variable that is a discrete value, and the movement of the target objects is represented by a continuous value, the expression (1) shows a hybrid system.

The expression (1) considers not the detailed dynamics of the entire robot 5 but only the dynamics of the robot hand, which is the hand of the robot 5 that actually grasps the object. Thus, it is possible to suitably reduce the calculation amount of the optimization process by the control input generation unit 35.

Further, the abstract model information I5 includes information for deriving the difference equation according to the expression (1) from the measurement information Im and the logical variable corresponding to the operation (the operation of grasping the target object i in the case of pick-and-place) causing the dynamics to switch. Thus, even when there is a variation in the position and the number of the target objects, the area (area G in FIG. 5) where the target objects are to be placed and the number of the robots 5 and the like, the abstract model generation unit 34 can determine the abstract model Σ in accordance with the environment of the target workspace 6 by combining the abstract model information I5 and the measurement information Im.

It is noted that, in place of the model shown in the expression (1), the abstract model generation unit 34 may generate any other hybrid system model such as mixed logical dynamical (MLD) system, Petri nets, automaton, and their combination.

(5-5) Control Input Generation Unit

The control input generation unit 35 determines the optimal control input for the robot 5 with respect to each time step based on the time step logical formula Lts supplied from the time step logical formula generation unit 33 and the abstract model Σ supplied from the abstract model generation unit 34. In this case, the control input generation unit 35 defines an evaluation function for the objective task and solves the optimization problem of minimizing the evaluation function with the abstract model Σ and the time step logical formula Lts which function as constraints. For example, the evaluation function is predetermined for each type of the objective task and stored in the memory 12 or the storage device 4.

For example, when the objective task is pick-and-place, the control input generation unit 35 determines the evaluation function so that the control input "$u_k$" and the distance "$d_k$" between the target object to be carried and the goal point to place the target object are minimized (i.e., the energy spent by the robot 5 is minimized). The distance $d_k$ described above corresponds to the distance between the target object 2 and the area G when the objective task is "the target object 2 is eventually present in the area G."

For example, the control input generation unit 35 determines the evaluation function to be the sum of the square of the distance $d_k$ and the square of the control input $u_k$ in all time steps, and solves the constrained mixed integer optimization problem shown in the following expression (2) with the abstract model Σ and the time-step logical formula Lts (that is, the logical OR of the candidates $\varphi_i$) which function as the constraint conditions.

$$\min_u \left( \sum_{k=0}^{T} (\|d_k\|_2^2 + \|u_k\|_2^2) \right) \qquad (2)$$

$$\text{s.t.} \sum \vee \phi_i$$

Here, "T" is the number of time steps to be considered in the optimization and it may be a target time step number or may be a predetermined number smaller than the target time step number as described later. In some embodiments, the control input generation unit 35 approximates the logic variable to a continuous value (i.e., solve a continuous relaxation problem). Thereby, the control input generation unit 35 can suitably reduce the calculation amount. When STL is adopted instead of linear temporal logic (LTL), it can be described as a nonlinear optimization problem.

Further, if the target time step number is long (e.g., larger than a predetermined threshold value), the control input generation unit 35 may set the time step number T in the expression (2) used for optimization to a value (e.g., the threshold value described above) smaller than the target time step number. In this case, the control input generation unit 35 sequentially determines the control input $u_k$ by solving the optimization problem based on the expression (2), for example, every time a predetermined number of time steps elapses.

In some embodiments, the control input generation unit 35 may solve the optimization problem based on the expression (2) for each predetermined event corresponding to the intermediate state for the accomplishment state of the objective task and determine the control input $u_k$ to be used. In this case, the control input generation unit 35 determines the time step number T in the expression (2) to be the number of time steps up to the next event occurrence. The event described above is, for example, an event in which the dynamics switches in the workspace 6. For example, when pick-and-place is the objective task, examples of the event include "the robot 5 grasps the object" and "the robot 5 finishes carrying one of the target objects to the destination (goal) point." For example, the event is predetermined for each type of the objective task, and information indicative of one or more events for each type of the objective task is stored in the storage device 4. Details of the process of determining the control input $u_k$ for each event will be described later in the flowchart of FIG. 11.

Even according to this mode, it is possible to suitably reduce the computational complexity of the optimization problem by reducing the time step number T in the expression (2).

(5-6) Sub-Task Sequence Generation Unit

The sub-task sequence generation unit 36 generates a sub-task sequence based on the control input information Ic supplied from the control input generation unit 35 and the sub-task information I4 stored in the application information storage unit 41. In this case, by referring to the sub-task information I4, the sub-task sequence generation unit 36 recognizes sub-tasks that the robot 5 can accept and converts the control input for each time step indicated by the control input information Ic into sub-tasks.

For example, in the sub-task information I4, there are defined functions representing two sub-tasks, the movement (reaching) of the robot hand and the grasping by the robot hand, as sub-tasks that can be accepted by the robot 5 when the objective task is pick-and-place. In this case, the function "Move" representing the reaching is, for example, a function that uses the following three arguments (parameter): the initial state of the robot 5 before the function is executed; the final state of the robot 5 after the function is executed; and the time to be required for executing the function. In addition, the function "Grasp" representing the grasping is, for example, a function that uses the following these arguments: the state of the robot 5 before the function is executed; the state of the target object to be grasped before the function is executed; and the logical variable δ. Here, the function "Grasp" indicates performing a grasping operation when the logical variable δ is "1", and indicates performing a releasing operation when the logic variable δ is "0". In this case, the sub-task sequence generation unit 36 determines the function "Move" based on the trajectory of the robot hand determined by the control input for each time step indicated by the control input information Ic, and determines the function "Grasp" based on the transition of the logical variable δ for each time step indicated by the control input information Ic.

Then, the sub-task sequence generation unit 36 generates a sub-task sequence configured by the function "Move" and the function "Grasp", and supplies a control signal S3 indicating the sub-task sequence to the robot 5. For example, if the objective task is "the target object 2 is finally present in the area G", the sub-task sequence generation unit 36 generates a sub-task sequence of the function "Move", the function "Grasp", the function "Move", and the function "Grasp" for the robotic hand closest to the target object 2. In this case, the robot hand closest to the target object 2 moves to the position of the target object 2 by the function "Move", grasps the target object 2 by the function "Grasp", moves to the area G by the function "Move", and places the target object 2 in the area G by the function "Grasp".

(6) Processing Flow

Figure 9:
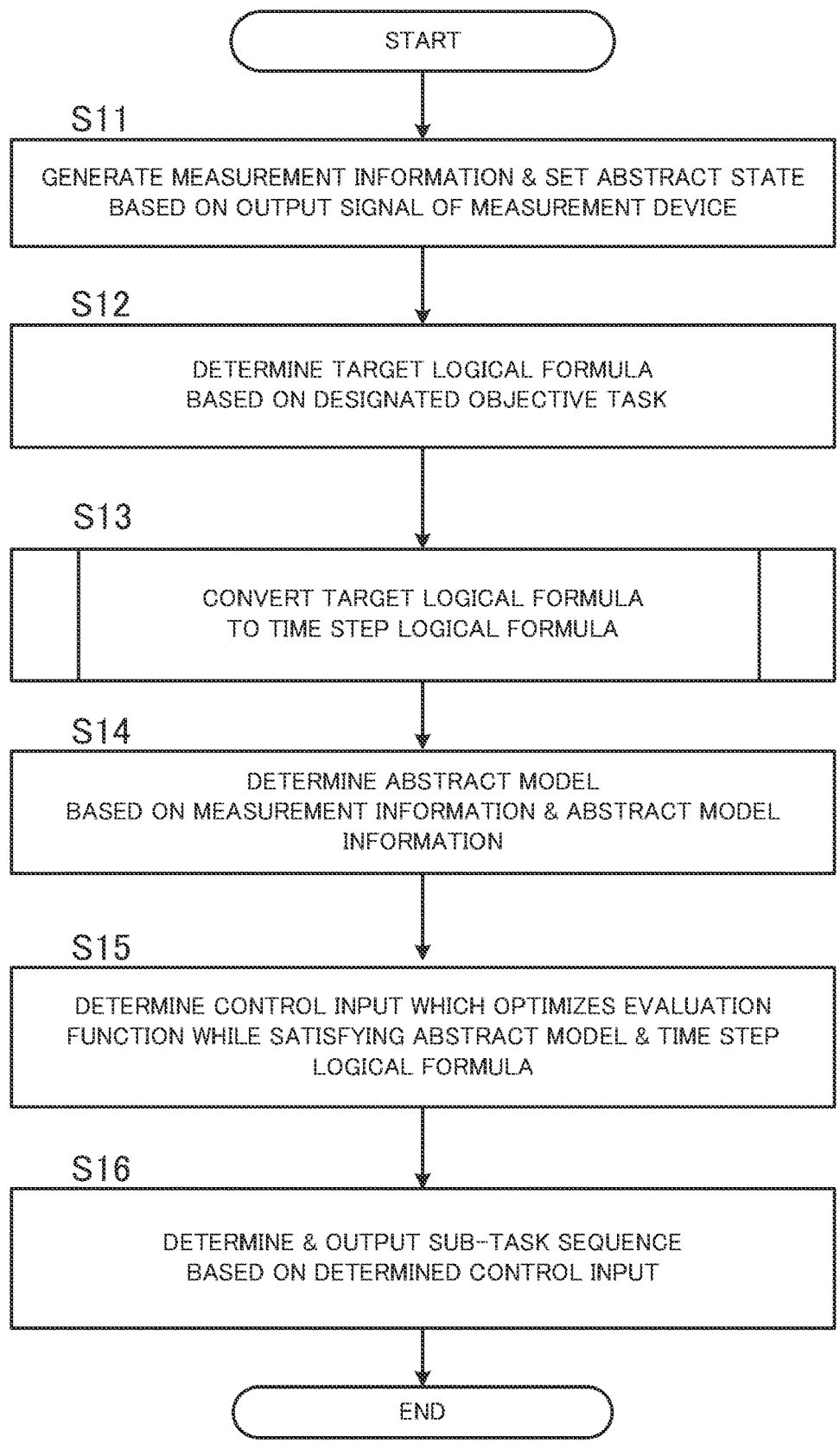
FIG. 9 is an example of a flowchart showing an outline of the robot control process.

FIG. 9 is an example of a flowchart showing an outline of the robot control process performed by the information processing device 1 according to the first example embodiment.

First, on the basis of the output signal S4 supplied from the measurement device 7, the abstract state setting unit 31 of the information processing device 1 generates the measurement information Im indicating the measurement result of objects existing in the working space 6 and sets the abstract state (step S11). Next, the target logical formula generation unit 32 determines the target logical formula Ltag from the objective task designated by the input signal S1 or the like (step S12). In this case, by referring to the constraint condition information I2, the target logical formula generation unit 32 adds constraint conditions in performing the objective task to the target logical formula Ltag. It is noted that the process at step S12 may be executed before step S11.

Then, the time step logical formula generation unit 33 converts the target logical formula Ltag to the time step logical formula Lts indicative of the state at each time step (step S13). In this case, the time step logical formula generation unit 33 determines the target time step number, and generates, as the time step logical formula Lts, the logical OR of the candidates φ each indicative of the state at each time step such that the target logical formula Ltag is satisfied with the target time step number. In this case, in some embodiments, by referring to the operation limit information I3, the time step logical formula generation unit 33 determines the feasibility of each candidate φ and exclude one or more candidates φ determined to be unfeasible from the time step logical formula Lts.

Next, the abstract model generation unit 34 determines the abstract model Σ suitable for the objective task based on the measurement information Im generated at step S11 and the abstract model information I5 (step S14). Then, the control input generation unit 35 determines a control input which optimizes the evaluation function and which satisfies the abstract model Σ and the time step logical formula Lts (step S15). Then, the sub-task sequence generation unit 36 determines the sub-task sequence based on the control input determined by the control input generation unit 35 and outputs a control signal S3 indicating the sub-task sequence to the robot 5 (Step S16).

Figure 10:
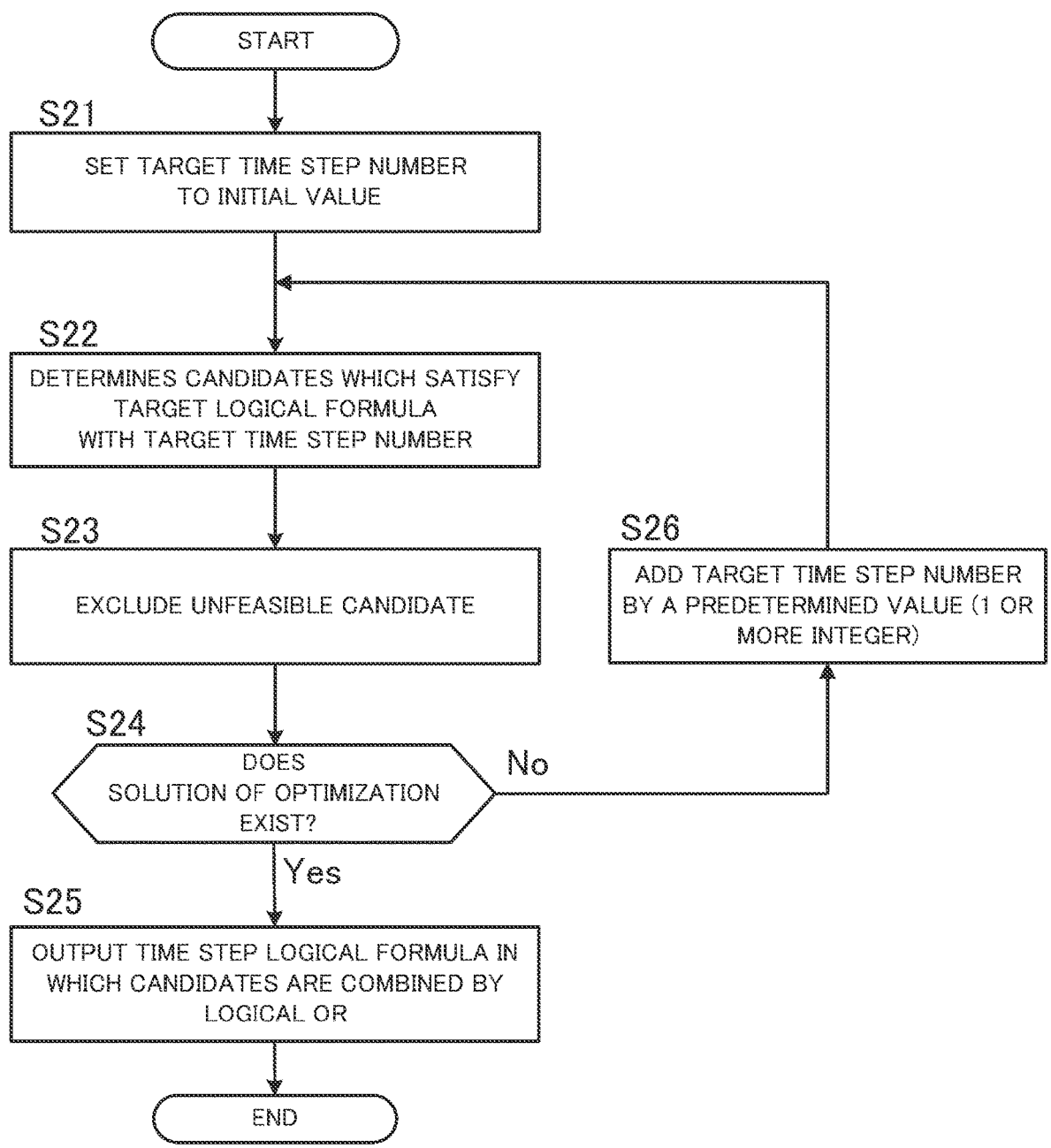
FIG. 10 is an example of a flowchart showing details of the processing at step S13 in FIG. 9.

FIG. 10 is an example of a flowchart indicative of the details of the processing at step S13 in FIG. 9.

First, the time step logical formula generation unit 33 sets the target time step number to an initial value (step S21). This initial value may be determined based on the user input or it may be a value stored in advance in the memory 12 or the storage device 4. The initial value is preferably set to a value (e.g., half of the number of time steps specified by the user) smaller than the number of time steps expected to perform the objective task.

Next, the time step logical formula generation unit 33 determines one or more candidates φ each of which is a logical formula indicative of a state at each time step and which satisfies the target logical formula Ltag with the target time step number set at step S21 (step S22). Then, by referring to the operation limit information I3, the time step logical formula generation unit 33 determines the feasibility of each of the candidates φ, and excludes a candidate φ determined to be unfeasible (step S23).

Next, the time step logical formula generation unit 33 determines whether or not there is a solution of the optimization at step S15 in FIG. 9 (step S24). In this case, the time step logical formula generation unit 33 determines whether or not the input generation unit 35 can derive such a control input for the robot 5 that optimizes the evaluation function with a feasible candidate φ while satisfying the abstract model Σ determined at step S14. When the solution of the optimization at step S15 exists (Step S24; Yes), the time step logical formula generation unit 33 outputs the time step logical formula Lts in which the candidates φ are combined by logical OR to the abstract model generation unit 34 (Step S25).

On the other hand, when the solution of the optimization in step S15 does not exist (step S24; No), the time step logical formula generation unit 33 determines that the objective task cannot be executed in the currently set target time step number. Therefore, in this case, the time step logical formula generation unit 33 adds the target time step number by a predetermined value (an integer of 1 or more) (Step S26). Then, the time step logical formula generation unit 33 executes the processing at Step S22 to Step S24 again.

According to the processing of the flowchart shown in FIG. 10, the time step logical formula generation unit 33 can suitably set the target time step number so that the target time step number becomes an appropriate value.

Figure 11:
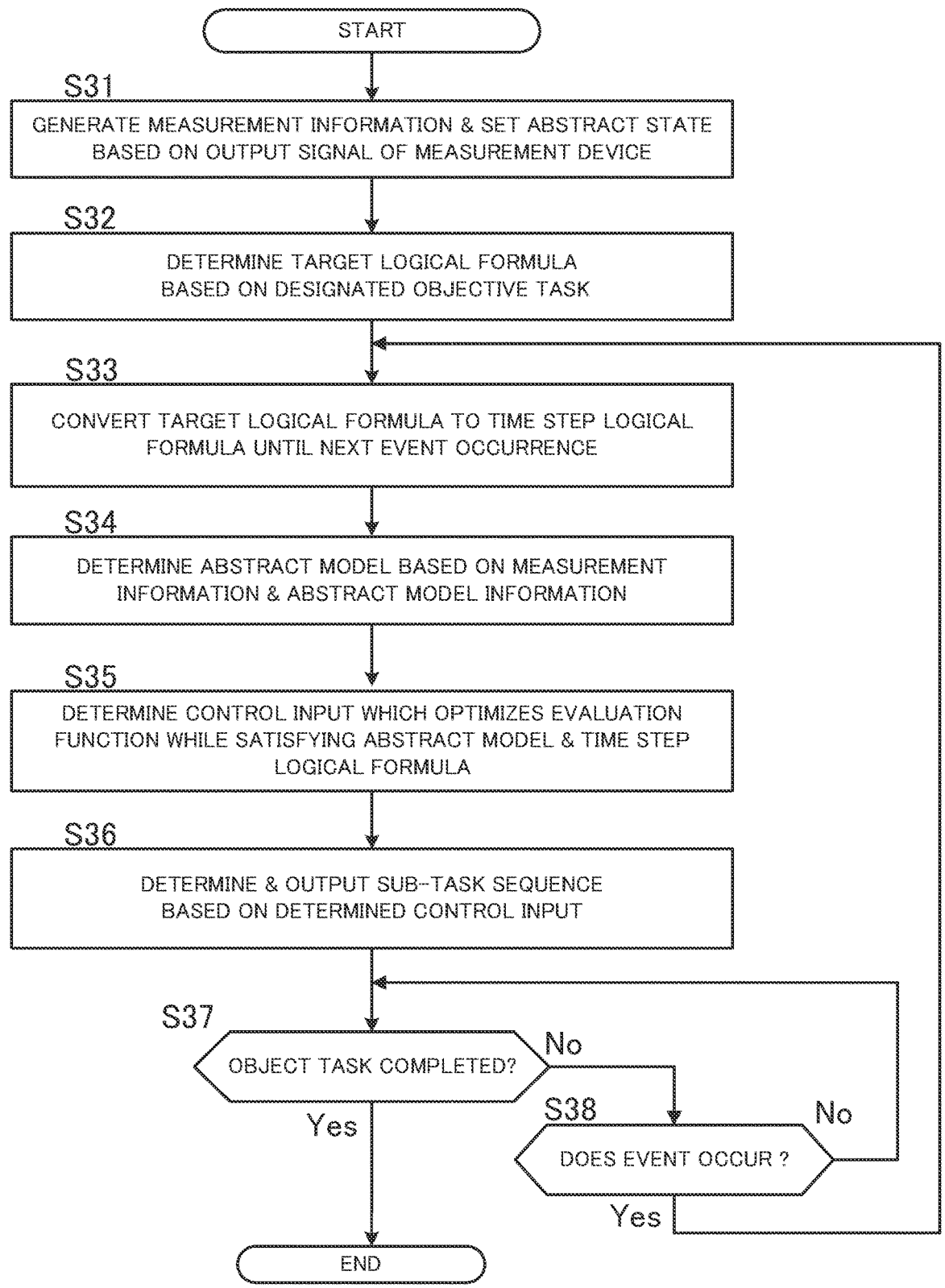
FIG. 11 is an example of a flowchart showing a modification of the robot control process indicated by the flowchart in FIG. 9.

FIG. 11 is a modification of the robot control process illustrated by the flowchart of FIG. 9, and is an example of a flowchart illustrating a robot control process for determining a sub-task sequence for each occurrence of an event.

The abstract state setting unit 31 and the target logical formula generation unit 32 performs the same process at Step S31 and Step S32 as the process at Step S11 and Step S12 in FIG. 9, respectively.

The time step logical formula generation unit 33 converts the target logical formula Ltag to the time step logical formula Lts until the next event occurrence (step S33). In this case, the time step logical formula generation unit 33 determines the target time step number to be required for the next event occurrence, and generates, as the time step logical formula Lts, a logical OR of the candidates φ each of which indicates the state at each time step and which satisfies the target logical formula Ltag with the target time step number. The target time step number in this case may be determined based on the determination method of the target time step number shown in FIG. 10, for example, or may be set to an appropriate value stored in advance in the storage device 4 or the like.

Next, the abstract model generation unit 34 determines the abstract model Σ suitable for the objective task, based on the measurement information Im generated at step S31 and the abstract model information I5 (step S34). The process of step S34 may be executed only once and it is not necessary to execute each event occurrence unless the number and type of the object is not changed during the operation by the robot 5. Therefore, when the process at Step S34 is already executed, the abstract model generation unit 34 may output the abstract model Σ already obtained at previous Step S34.

Next, the control input generation unit 35 determines a control input for optimizing the evaluation function while satisfying the abstract model Σ and the time step logical formula Lts (Step S35). In this case, the control input generation unit 35 determines the control input corresponding to the number of time steps necessary until the next event occurrence. Then, the sub-task sequence generation unit 36 determines the sub-task sequence based on the control input determined by the control input generation unit 35 and outputs a control signal S3 indicating the sub-task sequence to the robot 5 (Step S36).

Next, the information processing device 1 determines whether or not the objective task has been completed (Step S37). For example, by recognizing the state of the target objects and the like based on the output signal S4 supplied from the measurement device 7, The information processing device 1 determines whether or not the objective task has been completed. In another example, when the next event is the completion of the objective task, the information processing device 1 determines that the objective task has been completed at the time when the robot 5 receives the notification of normal completion of the sub-task sequence. When the objective task has been completed (Step S37; Yes), the information processing device 1 ends the processing of the flowchart.

On the other hand, if the objective task has not been completed (Step S37; No), the information processing device 1 determines whether or not the next event has occurred (Step S38). In this case, for example, by recognizing the state of the target object or the like based on the output signal S4 supplied from the measurement device 7, the information processing device 1 determines whether or not the next event has occurred. In another example, the information processing device 1 determines that an event has occurred at the time when the robot 5 receives a notification of the normal end of the sub-task sequence until the next event occurrence. When an event occurs (Step S38; Yes), the information processing device 1 returns the process to Step S33. In this case, the information processing device 1 executes again the process of generating the sub-task sequence necessary for occurrence of the next event at steps S33 to S36. On the other hand, if no event has occurred (Step S38; No), the information processing device 1 returns the process to Step S37.

Second Example Embodiment

Figure 12:
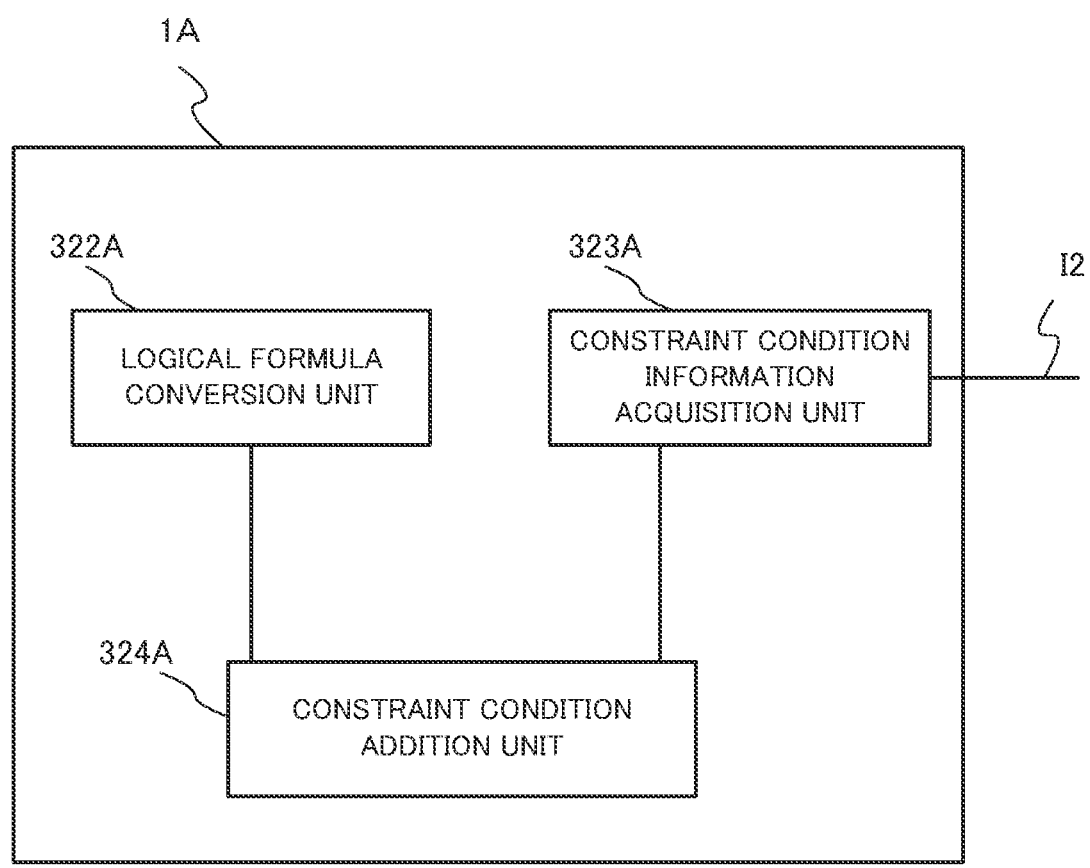
FIG. 12 is a schematic configuration diagram of an information processing device according to the second example embodiment.

FIG. 12 is a schematic configuration diagram of an information processing device 1A according to the second example embodiment. As shown in FIG. 12, the information processing device 1A mainly includes a logical formula conversion unit 322A, a constraint condition information acquisition unit 323A, and a constraint condition addition unit 324A.

The logical formula conversion unit 322A is configured to convert an objective task, which is a task to be performed by a robot, into a logical formula that is based on a temporal logic. The constraint condition information acquisition unit 323A is configured to acquire constraint condition information I2 indicative of a constraint condition to be satisfied in performing the objective task. The constraint condition addition unit 324A is configured to generate a target logical formula Ltag that is a logical formula obtained by adding a proposition indicative of the constraint condition to the logical formula generated by the logical formula conversion unit 322A.

According to the configuration of the second example embodiment, the information processing device 1A can suitably generate a target logical formula Ltag that explicitly specifies a constraint condition to be satisfied in performing the objective task, when the objective task to be performed by the robot is given.

Third Example Embodiment

Figure 13:
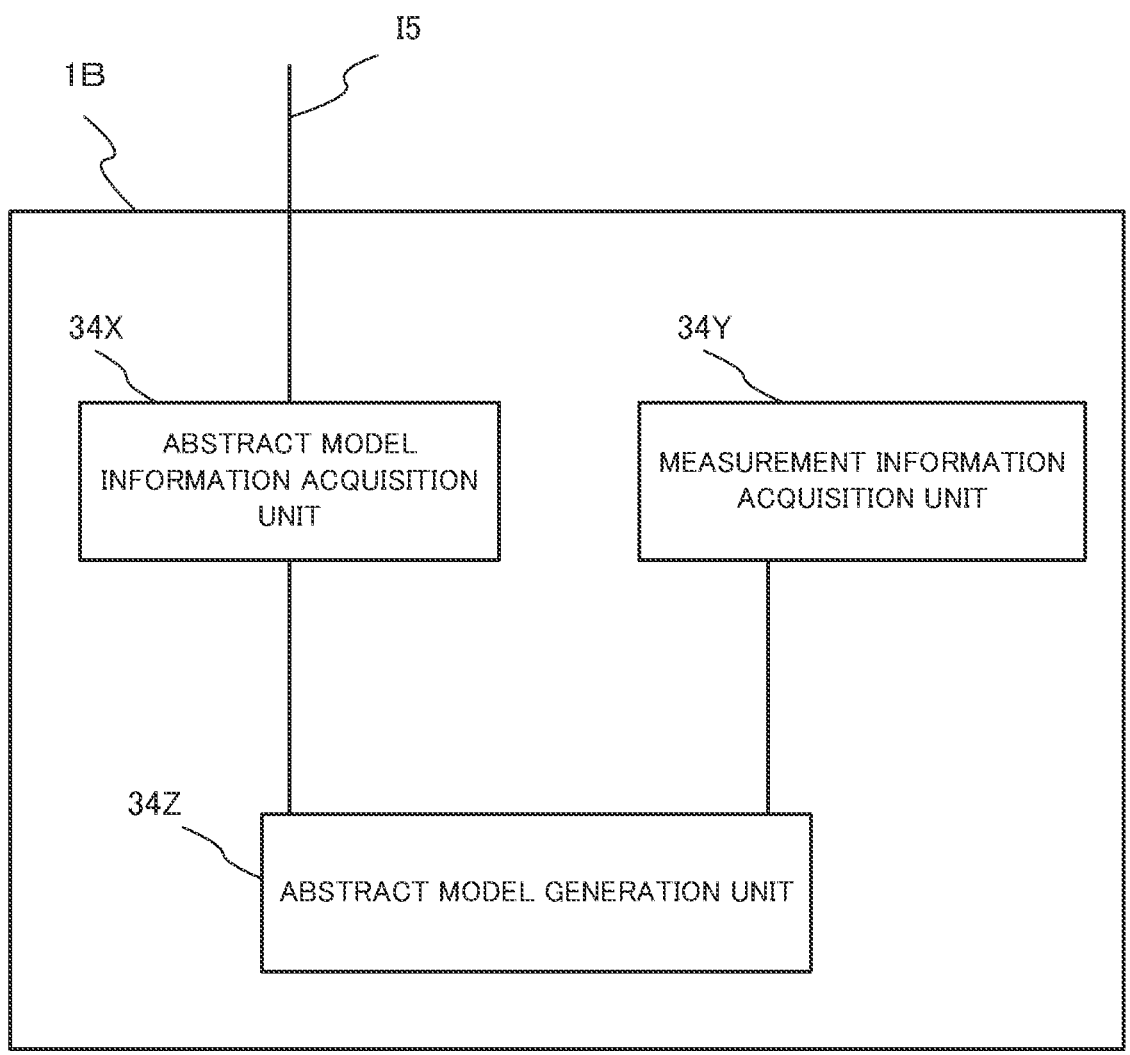
FIG. 13 is a schematic configuration diagram of an information processing device according to the third example embodiment.

FIG. 13 is a schematic configuration diagram of an information processing device 1B according to the third example embodiment. As shown in FIG. 13, the information processing device 1B mainly includes an abstract model information acquisition unit 34X, a measurement information acquisition unit 34Y, and an abstract model generation unit 34Z.

The abstract model information acquisition unit 34X is configured to acquire abstract model information I5 regarding an abstract model in which dynamics in a workspace 6 where a robot 5 performs an objective task is abstracted. The measurement information acquisition unit 34Y is configured to acquire measurement information Im indicating a measurement result in the workspace 6. The abstract model generation unit 34Z is configured to generate an abstract model Σ based on the abstract model information I5 and the measurement information Im.

Here, the abstract model information acquisition unit 34X, the measurement information acquisition unit 34Y, and the abstract model generation unit 34Z are realized by, for example, the abstract model generation unit 34 according to the first example embodiment.

According to the configuration of the third example embodiment, the information processing device 1B can suitably generate an abstract model Σ indicative of the actual dynamic model of the robot in a simplified manner when the objective task for causing the robot to work is given.

The whole or a part of the example embodiments described above (including modifications, the same applies hereinafter) can be described as, but not limited to, the following Supplementary Notes.

[Supplementary Note 1]
An information processing device comprising:
an abstract model information acquisition unit configured to acquire abstract model information regarding an abstract model in which dynamics in a workspace where a robot performs a task is abstracted;
a measurement information acquisition unit configured to acquire measurement information indicating a measurement result in the workspace; and
an abstract model generation unit configured to generate an abstract model based on the abstract model information and the measurement information.

[Supplementary Note 2]
The information processing device according to Supplementary Note 1,
wherein the abstract model generation unit is configured to generate the abstract model based on
information relating to the robot included in the measurement information and
information relating to a target object subjected to operation by the robot.

[Supplementary Note 3]
3. The information processing device according to Supplementary Note 1 or 2,
wherein the abstract model generation unit is configured, in a case where the robot performs a task relating to pick-and-place, to generate the abstract model that is a model of a hybrid system in which an operation of grasping a target object by the robot is abstractly expressed by a logical variable.

[Supplementary Note 4]
The information processing device according to any one of Supplementary Notes 1 to 3, further comprising
a control input generation unit configured to determine a control input for controlling the robot for each time step, based on the abstract model and a time step logical formula that is a logical formula indicative of a state for each time step to perform the task.

[Supplementary Note 5]
The information processing device according to Supplementary Note 4,
wherein the control input generation unit is configured to determine an evaluation function in accordance with the task, and
wherein the control input generation unit is configured to determine the control input which optimizes the evaluation function while satisfying the abstract model and the time step logical formula.

[Supplementary Note 6]
The information processing device according to Supplementary Note 4 or 5,
wherein the control input generation unit is configured to generate the control input for time steps required for an occurrence of an event that is necessary to occur by the time of completion of the task and generate the control input every time the event occurs.

[Supplementary Note 7]
The information processing device according to any one of Supplementary Notes 4 to 6, further comprising
a time step logical formula generation unit configured to generate the time step logical formula with the number of time steps, the time steps being necessary to complete the task or being required for an occurrence of an event that is necessary to occur by the time of completion of the task.

[Supplementary Note 8]
The information processing device according to Supplementary Note 7,
wherein the time step logical formula generation unit is configured to set the number of the time steps to a predetermined initial value and increase the number of the time steps until the time step logical formula with which the control input generation unit is able to determine the control input is generated.

[Supplementary Note 9]
The information processing device according to Supplementary Note 8,
wherein the time step logical formula generation unit is configured to set the initial value to a value smaller than the number of the time steps corresponding to a prospective work time for the task, the prospective work time being determined by a user.

[Supplementary Note 10]
The information processing device according to any one of Supplementary Notes 4 to 9, further comprising
a sub-task sequence generation unit configured to generate, on a basis of the control input for each time step, a sequence of sub-tasks each of which is a task in units of command that the robot can accept.

[Supplementary Note 11]
A control method executed by an information processing device, the control method comprising:
acquiring abstract model information regarding an abstract model in which dynamics in a workspace where a robot performs a task is abstracted;
acquiring measurement information indicating a measurement result in the workspace; and
generating an abstract model based on the abstract model information and the measurement information.

[Supplementary Note 12]
A storage medium storing a program executed by a computer, the program causing the computer to function as:
an abstract model information acquisition unit configured to acquire abstract model information regarding an abstract model in which dynamics in a workspace where a robot performs a task is abstracted;
a measurement information acquisition unit configured to acquire measurement information indicating a measurement result in the workspace; and
an abstract model generation unit configured to generate an abstract model based on the abstract model information and the measurement information.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A, 1B Information processing device
2 Input device
3 Display device
4 Storage device 5 Robot
6 Workspace
7 Measurement device
41 Application information storage unit
100 Robot control system

What is claimed is:

1. An information processing device comprising:
at least one memory storing instructions; and
at least one processor configured to execute the instructions to:
acquire measurement information indicating measurement results in a workspace where a robot performs a task;
acquire abstract model information indicating:
an abstract model in which the measurement results in the workspace are abstracted by a hybrid system, the hybrid system mixing continuous and discrete dynamics; and
switching conditions of the continuous and discrete dynamics in the hybrid system;
generate the abstract model based on the abstract model information and the measurement information;
acquire a target logical formula in temporal logic representing a final state to be achieved in performing the task;
acquire a time step logical formula indicating a state for each time step to perform the task;
determine a control input for controlling the robot for each time step, based on the abstract model, the target logical formula, and the time step logical formula; and
control the robot in accordance with the determined control input.

2. The information processing device according to claim 1,
wherein the at least one processor is configured to generate the abstract model based on:
information relating to the robot included in the measurement information; and
information relating to a target object subjected to operation by the robot.

3. The information processing device according to claim 1,
wherein the at least one processor is configured to, in a case where the robot performs a task relating to pick-and-place, generate the abstract model of the hybrid system in which an operation of grasping a target object by the robot is abstractly expressed by a logical variable.

4. The information processing device according to claim 1,
wherein the at least one processor is configured to determine an evaluation function in accordance with the task, and
wherein the at least one processor is configured to determine the control input which optimizes the evaluation function while satisfying the abstract model and the time step logical formula.

5. The information processing device according to claim 1,
wherein the at least one processor is configured to generate the control input for time steps required for an occurrence of an event that is necessary to occur by time of completion of the task and generate the control input every time the event occurs.

6. The information processing device according to claim 1,
wherein the at least one processor is further configured to generate the time step logical formula with a number of time steps necessary to complete the task or required for an occurrence of an event that is necessary to occur by time of completion of the task.

7. The information processing device according to claim 6,
wherein the at least one processor is configured to set the number of the time steps to a predetermined initial value and increase the number of the time steps until the time step logical formula with which the control input is able to be determined is generated.

8. The information processing device according to claim 7,
wherein the at least one processor is configured to set the initial value to a value smaller than the number of the time steps corresponding to a prospective work time for the task, the prospective work time being determined by a user.

9. The information processing device according to claim 1,
wherein the at least one processor is further configured to generate, on a basis of the control input for each time step, a sequence of sub-tasks that are each a task in units of command that the robot can accept.

10. A control method performed by an information processing device and comprising:
acquiring measurement information indicating measurement results in a workspace where a robot performs a task;
acquiring abstract model information indicating:
an abstract model in which the measurement results in the workspace are abstracted by a hybrid system, the hybrid system mixing continuous and discrete dynamics; and
switching conditions of the continuous and discrete dynamics in the hybrid system;
generating the abstract model based on the abstract model information and the measurement information;
acquiring a target logical formula in temporal logic representing a final state to be achieved in performing the task;
acquiring a time step logical formula indicating a state for each time step to perform the task;
determining a control input for controlling the robot for each time step, based on the abstract model, the target logical formula, and the time step logical formula; and
controlling the robot in accordance with the determined control input.

11. A non-transitory computer readable storage medium storing a program executed by a computer, the program causing the computer to:
acquire measurement information indicating measurement results in a workspace where a robot performs a task;
acquire abstract model information indicating:
an abstract model in which the measurement results in the workspace are abstracted by a hybrid system, the hybrid system mixing continuous and discrete dynamics; and
switching conditions of the continuous and discrete dynamics in the hybrid system;
generate the abstract model based on the abstract model information and the measurement information;

acquire a target logical formula in temporal logic representing a final state to be achieved in performing the task;
acquire a time step logical formula indicating a state for each time step to perform the task;
determine a control input for controlling the robot for each time step, based on the abstract model, the target logical formula, and the time step logical formula; and
control the robot in accordance with the determined control input.

* * * * *